United States Patent
Batruni

(10) Patent No.: US 10,489,481 B1
(45) Date of Patent: Nov. 26, 2019

(54) EFFICIENT MATRIX PROPERTY DETERMINATION WITH PIPELINING AND PARALLELISM

(71) Applicant: Cyber Atomics, Inc., Danville, CA (US)

(72) Inventor: Roy Batruni, Danville, CA (US)

(73) Assignee: Cyber Atomics, Inc., Danville, CA (US)

( * ) Notice: Subject to any disclaimer, the term of this patent is extended or adjusted under 35 U.S.C. 154(b) by 10 days.

(21) Appl. No.: 15/901,540

(22) Filed: Feb. 21, 2018

Related U.S. Application Data

(60) Provisional application No. 62/463,339, filed on Feb. 24, 2017.

(51) Int. Cl.
*G06F 17/16* (2006.01)

(52) U.S. Cl.
CPC .................................. *G06F 17/16* (2013.01)

(58) Field of Classification Search
CPC ........................................................ G06F 17/16
USPC ........................................................ 708/520
See application file for complete search history.

(56) References Cited

U.S. PATENT DOCUMENTS

| | | | | |
|---|---|---|---|---|
| 7,451,173 | B1 * | 11/2008 | Van Benthem | G06F 17/11 708/607 |
| 9,798,701 | B2 * | 10/2017 | Narayanaswami | G06F 17/16 |
| 2004/0008803 | A1 * | 1/2004 | Aldrovandi | H04L 25/0204 375/347 |
| 2008/0317172 | A1 * | 12/2008 | Zhang | H04B 7/0413 375/340 |

OTHER PUBLICATIONS

Pierre Corrieu. "Fast Computation of Moore-Penrose Inverse Matrices." Neural Information Processing—Letters and Reviews 8.2 (2005).

\* cited by examiner

*Primary Examiner* — Tan V Mai
(74) *Attorney, Agent, or Firm* — Van Pelt, Yi & James LLP

(57) ABSTRACT

Matrix processing includes: initializing a current matrix based at least in part on an original matrix; iteratively determining a matrix property using a plurality of iteration cycles, including, in an iteration cycle: partitioning the current matrix to obtain a plurality of partitions, wherein the plurality of partitions includes a submatrix; modifying the submatrix based at least in part on other partitions of the plurality of partitions to provide a current matrix for a next iteration; and continuing to iterate until a condition is met. Matrix processing further includes obtaining the matrix property from an iteration result; and outputting the matrix property.

19 Claims, 18 Drawing Sheets

$$A = \begin{array}{c} H \\ \begin{array}{|cccccccc|} \hline 1.7585 & 2.0481 & 0.5885 & 2.0782 & 1.7083 & 0.5593 & 1.3513 & 0.9753 \\ 2.0481 & 2.5900 & 0.9926 & 2.6425 & 2.0968 & 0.5894 & 1.8020 & 1.4876 \\ 0.5885 & 0.9926 & 0.6686 & 1.0291 & 0.7506 & 0.1172 & 0.8342 & 0.8317 \\ 2.0782 & 2.6425 & 1.0291 & 2.6969 & 2.1358 & 0.5945 & 1.8459 & 1.5334 \\ 1.7083 & 2.0968 & 0.7506 & 2.1358 & 1.7460 & 0.5497 & 1.4989 & 1.0941 \\ 0.5593 & 0.5894 & 0.1172 & 0.5945 & 0.5497 & 0.2464 & 0.4459 & 0.1556 \\ 1.3513 & 1.8020 & 0.8342 & 1.8459 & 1.4989 & 0.4459 & 1.4390 & 1.0589 \\ 0.9753 & 1.4876 & 0.8317 & 1.5334 & 1.0941 & 0.1556 & 1.0589 & 1.1916 \\ \hline \end{array} \\ W \end{array}$$

FIG. 3B $$A = \begin{array}{c} \begin{array}{|cccccccc|} \hline 1.7585 & 2.0481 & 0.5885 & 2.0782 & 1.7083 & 0.5593 & 1.3513 & 0.9753 \\ 2.0481 & 0.2047 & 0.3071 & 0.2221 & 0.1072 & -0.0620 & 0.2282 & 0.3516 \\ 0.5885 & 0.3071 & 0.4716 & 0.3336 & 0.1790 & -0.0700 & 0.3820 & 0.5053 \\ 2.0782 & 0.2221 & 0.3336 & 0.2409 & 0.1170 & -0.0665 & 0.2489 & 0.3807 \\ 1.7083 & 0.1072 & 0.1790 & 0.1170 & 0.0866 & 0.0064 & 0.1862 & 0.1466 \\ 0.5593 & -0.0620 & -0.0700 & -0.0665 & 0.0064 & 0.0685 & 0.0161 & -0.1546 \\ 1.3513 & 0.2282 & 0.3820 & 0.2489 & 0.1862 & 0.0161 & 0.4006 & 0.3094 \\ 0.9753 & 0.3516 & 0.5053 & 0.3807 & 0.1466 & -0.1546 & 0.3094 & 0.6506 \\ \hline \end{array} \\ W'' \end{array}$$

$$W'' = W - G(1/1.7585) R$$

FIG. 3C $$A = \begin{array}{|cccccccc|} \hline 1.7585 & 2.0481 & 0.5885 & 2.0782 & 1.7083 & 0.5593 & 1.3513 & 0.9753 \\ 2.0481 & 0.2047 & 0.3071 & 0.2221 & 0.1072 & -0.0620 & 0.2282 & 0.3516 \\ 0.5885 & 0.3071 & 0.4716 & 0.3336 & 0.1790 & -0.0700 & 0.3820 & 0.5053 \\ 2.0782 & 0.2221 & 0.3336 & 0.2409 & 0.1170 & -0.0665 & 0.2489 & 0.3807 \\ 1.7083 & 0.1072 & 0.1790 & 0.1170 & 0.0866 & 0.0064 & 0.1862 & 0.1466 \\ 0.5593 & -0.0620 & -0.0700 & -0.0665 & 0.0064 & 0.0685 & 0.0161 & -0.1546 \\ 1.3513 & 0.2282 & 0.3820 & 0.2489 & 0.1862 & 0.0161 & 0.4006 & 0.3094 \\ 0.9753 & 0.3516 & 0.5053 & 0.3807 & 0.1466 & -0.1546 & 0.3094 & 0.6506 \\ \hline \end{array}$$

FIG. 3D $$A = \begin{array}{cccccccc} 1.7585 & 2.0481 & 0.5885 & 2.0782 & 1.7083 & 0.5593 & 1.3513 & 0.9753 \\ 2.0481 & 0.2047 & 0.3071 & 0.2221 & 0.1072 & -0.0620 & 0.2282 & 0.3516 \\ 0.5885 & 0.3071 & 0.0107 & 0.0004 & 0.0180 & 0.0231 & 0.0395 & -0.0223 \\ 2.0782 & 0.2221 & 0.0004 & 0.0000 & 0.0006 & 0.0008 & 0.0013 & -0.0007 \\ 1.7083 & 0.1072 & 0.0180 & 0.0006 & 0.0304 & 0.0389 & 0.0667 & -0.0376 \\ 0.5593 & -0.0620 & 0.0231 & 0.0008 & 0.0389 & 0.0497 & 0.0853 & -0.0481 \\ 1.3513 & 0.2282 & 0.0395 & 0.0013 & 0.0667 & 0.0853 & 0.1462 & -0.0825 \\ 0.9753 & 0.3516 & -0.0223 & -0.0007 & -0.0376 & -0.0481 & -0.0825 & 0.0466 \end{array}$$

$$W''' = W'' - G'' (1/0.2047) R''$$

FIG. 3E $$A = \begin{array}{cccccccc} 1.7585 & 2.0481 & 0.5885 & 2.0782 & 1.7083 & 0.5593 & 1.3513 & 0.9753 \\ 2.0481 & 0.2047 & 0.3071 & 0.2221 & 0.1072 & 0.0620 & 0.2282 & 0.3516 \\ 0.5885 & 0.3071 & 0.0107 & 0.0004 & 0.0180 & 0.0231 & 0.0395 & -0.0223 \\ 2.0782 & 0.2221 & 0.0004 & 0.0000 & 0.0006 & 0.0008 & 0.0013 & -0.0007 \\ 1.7083 & 0.1072 & 0.0180 & 0.0006 & 0.0304 & 0.0389 & 0.0667 & -0.0376 \\ 0.5593 & -0.0620 & 0.0231 & 0.0008 & 0.0389 & 0.0497 & 0.0853 & -0.0481 \\ 1.3513 & 0.2282 & 0.0395 & 0.0013 & 0.0667 & 0.0853 & 0.1462 & -0.0825 \\ 0.9753 & 0.3516 & -0.0223 & -0.0007 & -0.0376 & -0.0481 & -0.0825 & 0.0466 \end{array}$$

FIG. 3F $$A = \begin{array}{cccccccc} 1.7585 & 2.0481 & 0.5885 & 2.0782 & 1.7083 & 0.5593 & 1.3513 & 0.9753 \\ 2.0481 & 0.2047 & 0.3071 & 0.2221 & 0.1072 & 0.0620 & 0.2282 & 0.3516 \\ 0.5885 & 0.3071 & 0.0107 & 0.0004 & 0.0180 & 0.0231 & 0.0395 & -0.0223 \\ 2.0782 & 0.2221 & 0.0004 & -0.0000 & 0.0000 & 0.0000 & 0.0000 & -0.0000 \\ 1.7083 & 0.1072 & 0.0180 & 0.0000 & -0.0000 & -0.0000 & -0.0000 & 0.0000 \\ 0.5593 & -0.0620 & 0.0231 & 0.0000 & -0.0000 & -0.0000 & -0.0000 & 0.0000 \\ 1.3513 & 0.2282 & 0.0395 & 0.0000 & -0.0000 & -0.0000 & -0.0000 & 0.0000 \\ 0.9753 & 0.3516 & -0.0223 & -0.0000 & 0.0000 & 0.0000 & 0.0000 & -0.0000 \end{array}$$

$$W'''' = W''' - G''' (1/0.0107) R'''$$

FIG. 3G $$A = \begin{array}{c} \\ \\ \\ \\ G \end{array} \begin{array}{|cccc|cccc|} \hline 0.0462 & 0.3171 & 0.3816 & 0.4898 & 1.0000 & 0 & 0 & 0 \\ 0.0971 & 0.9502 & 0.7655 & 0.4456 & 0 & 1.0000 & 0 & 0 \\ 0.8235 & 0.0344 & 0.7952 & 0.6463 & 0 & 0 & 1.0000 & 0 \\ 0.6948 & 0.4387 & 0.1869 & 0.7094 & 0 & 0 & 0 & 1.0000 \\ \hline 1.0000 & 0 & 0 & 0 & 0 & 0 & 0 & 0 \\ 0 & 1.0000 & 0 & 0 & 0 & 0 & 0 & 0 \\ 0 & 0 & 1.0000 & 0 & 0 & 0 & 0 & 0 \\ 0 & 0 & 0 & 1.0000 & 0 & 0 & 0 & 0 \\ \hline \end{array}$$

FIG. 4B $$A = \begin{array}{c} \\ \\ \\ \\ \\ G \end{array} \begin{array}{|c|ccccccc|} \hline \multicolumn{1}{c}{H} & & & & R & & & \\ \hline 0.0462 & 0.3171 & 0.3816 & 0.4898 & 1.0000 & 0 & 0 & 0 \\ 0.0971 & 0.9502 & 0.7655 & 0.4456 & 0 & 1.0000 & 0 & 0 \\ 0.8235 & 0.0344 & 0.7952 & 0.6463 & 0 & 0 & 1.0000 & 0 \\ 0.6948 & 0.4387 & 0.1869 & 0.7094 & 0 & 0 & 0 & 1.0000 \\ 1.0000 & 0 & 0 & 0 & 0 & 0 & 0 & 0 \\ 0 & 1.0000 & 0 & 0 & 0 & 0 & 0 & 0 \\ 0 & 0 & 1.0000 & 0 & 0 & 0 & 0 & 0 \\ 0 & 0 & 0 & 1.0000 & 0 & 0 & 0 & 0 \\ \hline \multicolumn{5}{c}{W} & & & \\ \end{array}$$

FIG. 4C $$A = \begin{array}{c} \\ \\ \\ \\ \\ G \end{array} \begin{array}{|c|ccccccc|} \hline & & & & R & & & \\ \hline 0.0462 & 0.3171 & 0.3816 & 0.4898 & 1.0000 & 0 & 0 & 0 \\ 0.0971 & 0.2831 & -0.0372 & -0.5847 & -2.1037 & 1.0000 & 0 & 0 \\ 0.8235 & -5.6210 & -6.0098 & -8.0885 & -17.8348 & 0 & 1.0000 & 0 \\ 0.6948 & -4.3333 & -5.5552 & -6.6611 & -15.0489 & 0 & 0 & 1.0000 \\ 1.0000 & -6.8679 & -8.2640 & -10.6075 & -21.6584 & 0 & 0 & 0 \\ 0 & 1.0000 & 0 & 0 & 0 & 0 & 0 & 0 \\ 0 & 0 & 1.0000 & 0 & 0 & 0 & 0 & 0 \\ 0 & 0 & 0 & 1.0000 & 0 & 0 & 0 & 0 \\ \hline \multicolumn{5}{c}{W'} & & & \\ \end{array}$$

$$W' = W - G\,(1/0.0462)\,R$$

FIG. 4D $$A = \begin{array}{|cc|cccccc|}
\hline
0.0462 & 0.3171 & 0.3816 & 0.4898 & 1.0000 & 0 & 0 & 0 \\
0.0971 & 0.2831 & -0.0372 & -0.5847 & -2.1037 & 1.0000 & 0 & 0 \\
0.8235 & -5.6210 & -6.0098 & -8.0885 & -17.8348 & 0 & 1.0000 & 0 \\
0.6948 & -4.3333 & -5.5552 & -6.6611 & -15.0489 & 0 & 0 & 1.0000 \\
1.0000 & -6.8679 & -8.2640 & -10.6075 & -21.6584 & 0 & 0 & 0 \\
0 & 1.0000 & 0 & 0 & 0 & 0 & 0 & 0 \\
0 & 0 & 1.0000 & 0 & 0 & 0 & 0 & 0 \\
0 & 0 & 0 & 1.0000 & 0 & 0 & 0 & 0 \\
\hline
\end{array}$$

$$W''' \equiv W'' - G'' \, (1/0.2831) \, R''$$

FIG. 4E $$A = \begin{array}{|cc|cccccc|}
\hline
0.0462 & 0.3171 & 0.3816 & 0.4898 & 1.0000 & 0 & 0 & 0 \\
0.0971 & 0.2831 & -0.0372 & -0.5847 & -2.1037 & 1.0000 & 0 & 0 \\
0.8235 & -5.6210 & -6.7479 & -19.6973 & -59.5995 & 19.8527 & 1.0000 & 0 \\
0.6948 & -4.3333 & -6.1241 & -15.6103 & -47.2457 & 15.3047 & 0 & 1.0000 \\
1.0000 & -6.8679 & -9.1657 & -24.7915 & -72.6879 & 24.2567 & 0 & 0 \\
0 & 1.0000 & 0.1313 & 2.0653 & 7.4302 & -3.5319 & 0 & 0 \\
0 & 0 & 1.0000 & 0 & 0 & 0 & 0 & 0 \\
0 & 0 & 0 & 1.0000 & 0 & 0 & 0 & 0 \\
\hline
\end{array}$$

$$W''' \equiv W'' - G'' \, (1/0.2831) \, R''$$

FIG. 4F $$A = \begin{array}{cc|cccccc|}
0.0462 & 0.3171 & 0.3816 & 0.4898 & 1.0000 & 0 & 0 & 0 \\
0.0971 & 0.2831 & -0.0372 & -0.5847 & -2.1037 & 1.0000 & 0 & 0 \\
\hline
0.8235 & -5.6210 & -6.7479 & -19.6973 & -59.5995 & 19.8527 & 1.0000 & 0 \\
0.6948 & -4.3333 & -6.1241 & -15.6103 & -47.2457 & 15.3047 & 0 & 1.0000 \\
1.0000 & -6.8679 & -9.1657 & -24.7915 & -72.6879 & 24.2567 & 0 & 0 \\
0 & 1.0000 & 0.1313 & 2.0653 & 7.4302 & -3.5319 & 0 & 0 \\
0 & 0 & 1.0000 & 0 & 0 & 0 & 0 & 0 \\
0 & 0 & 0 & 1.0000 & 0 & 0 & 0 & 0 \\
\hline
\end{array}$$

FIG. 4G $$A = \begin{matrix} 0.0462 & 0.3171 & 0.3816 & 0.4898 & 1.0000 & 0 & 0 & 0 \\ 0.0971 & 0.2831 & -0.0372 & -0.5847 & -2.1037 & 1.0000 & 0 & 0 \\ 0.8235 & -5.6210 & -6.7479 & -19.697 & -59.599 & 19.852 & 1.0000 & 0 \\ 0.6948 & -4.3333 & -6.1241 & 2.2662 & 6.8447 & -2.7130 & -0.9076 & 1.0000 \\ 1.0000 & -6.8679 & -9.1657 & 1.9636 & 8.2669 & -2.7095 & -1.3583 & 0 \\ 0 & 1.0000 & 0.1313 & 1.6820 & 6.2704 & -3.1456 & 0.0195 & 0 \\ 0 & 0 & 1.0000 & -2.9190 & -8.8323 & 2.9421 & 0.1482 & 0 \\ 0 & 0 & 0 & 1.0000 & 0 & 0 & 0 & 0 \end{matrix}$$

$$W'''' = W''' - G''' (-1/6.7479) R'''$$

FIG. 4H $$A = \begin{matrix} 0.0462 & 0.3171 & 0.3816 & 0.4898 & 1.0000 & 0 & 0 & 0 \\ 0.0971 & 0.2831 & -0.0372 & -0.5847 & -2.1037 & 1.0000 & 0 & 0 \\ 0.8235 & -5.6210 & -6.7479 & -19.697 & -59.599 & 19.852 & 1.0000 & 0 \\ 0.6948 & -4.3333 & -6.1241 & 2.2662 & 6.8447 & -2.7130 & -0.9076 & 1.0000 \\ 1.0000 & -6.8679 & -9.1657 & 1.9636 & 8.2669 & -2.7095 & -1.3583 & 0 \\ 0 & 1.0000 & 0.1313 & 1.6820 & 6.2704 & -3.1456 & 0.0195 & 0 \\ 0 & 0 & 1.0000 & -2.9190 & -8.8323 & 2.9421 & 0.1482 & 0 \\ 0 & 0 & 0 & 1.0000 & 0 & 0 & 0 & 0 \end{matrix}$$

FIG. 4I $$A = \begin{matrix} 0.0462 & 0.3171 & 0.3816 & 0.4898 & 1.0000 & 0 & 0 & 0 \\ 0.0971 & 0.2831 & -0.0372 & -0.5847 & -2.1037 & 1.0000 & 0 & 0 \\ 0.8235 & -5.6210 & -6.7479 & -19.6973 & -59.5995 & 19.8527 & 1.0000 & 0 \\ 0.6948 & -4.3333 & -6.1241 & 2.2662 & 6.8447 & -2.7130 & -0.9076 & 1.0000 \\ 1.0000 & -6.8679 & -9.1657 & 1.9636 & 2.3362 & -0.3588 & -0.5719 & -0.8665 \\ 0 & 1.0000 & 0.1313 & 1.6820 & 1.1903 & -1.1320 & 0.6930 & -0.7422 \\ 0 & 0 & 1.0000 & -2.9190 & -0.0159 & -0.5524 & -1.0208 & 1.2881 \\ 0 & 0 & 0 & 1.0000 & -3.0203 & 1.1971 & 0.4005 & -0.4413 \end{matrix}$$

$$W''''' = W'''' - G'''' (1/2.2662) R''''$$

FIG. 4J $$A = \begin{matrix} 0.0462 & 0.3171 & 0.3816 & 0.4898 & 1.0000 & 0 & 0 & 0 \\ 0.0971 & 0.2831 & -0.0372 & -0.5847 & -2.1037 & 1.0000 & 0 & 0 \\ 0.8235 & -5.6210 & -6.7479 & -19.6973 & -59.5995 & 18.3527 & 1.0000 & 0 \\ 0.6948 & -4.3333 & -6.1241 & 2.2662 & 6.8447 & -2.7130 & -0.9076 & 1.0000 \\ 1.0000 & -6.8679 & -9.1657 & 1.9636 & 2.3362 & -0.3588 & -0.5719 & -0.8665 \\ 0 & 1.0000 & 0.3415 & 1.6820 & 1.1903 & -1.1320 & 0.6930 & -0.7422 \\ 0 & 0 & 1.0000 & -2.9190 & -0.0159 & -0.5524 & -1.0208 & 1.2881 \\ 0 & 0 & 0 & 1.0000 & -3.0203 & 1.1971 & 0.4005 & -0.4413 \end{matrix}$$

$$W^{uuu} \equiv -A(1:4,1:4)^{-1} \equiv \begin{matrix} 2.3362 & -0.3588 & -0.5719 & -0.8665 \\ 1.1903 & -1.1320 & 0.6930 & -0.7422 \\ -0.0159 & -0.5524 & -1.0208 & 1.2881 \\ -3.0203 & 1.1971 & 0.4005 & -0.4413 \end{matrix}$$

FIG. 4K

| N x N Matrices | FLOPS | Mults | Min Latency | Notes |
|---|---|---|---|---|
| Inversion 1 | $2 N^3$ | $N^3$ | $N$ | Low latency |
| Inversion 2 | $5/3 N^3$ | $5/6 N^3$ | $N+1$ | Slightly higher latency |
| Pseudo Inverse | $2 m N^2$ | $m N^2$ | $m$ | m is rank of NxN matrix |
| Rank Estimation | $2/3 m N^2$ | $1/3 m N^2$ | $m$ | m is rank of NxN matrix |
| Determinant 1 | $2/3 N^3$ | $1/3 N^3$ | $N$ | |
| Determinant 2 | $2/3 m N^2$ | $1/3 m N^2$ | $m$ | Det is prod of m singular values, actual det = 0 |
| $x = A^{-1} b$ | $N^3$ | $1/2 N^3$ | $N$ | Low latency |
| $X = A^{-1} B$ | $3 N^3$ | $3/2 N^3$ | $N$ | |
| $X = A^{-1} B$ | $2 N^3$ | $N^3$ | $N+2$ | Slightly higher latency |
| $X = C A^{-1} B$ | $14/3 N^3$ | $7/3 N^3$ | $N$ | |

FIG. 11

EFFICIENT MATRIX PROPERTY DETERMINATION WITH PIPELINING AND PARALLELISM

CROSS REFERENCE TO OTHER APPLICATIONS

This application claims priority to U.S. Provisional Patent Application No. 62/463,339 entitled RANK DETERMINATION, MATRIX INVERSION AND RELATIONSHIPS TO CHOLESKY DECOMPOSITION filed Feb. 24, 2017 which is incorporated herein by reference in its entirety for all purposes.

BACKGROUND OF THE INVENTION

Modern computer applications often involve gathering and processing large amounts of information (e.g., databases with hundreds of thousands of rows or more). Such data is often represented using matrices. Applications that process high volumes of matrix data are very computationally intensive. Many applications employ common data analytics tools to perform analytical operations and identifying properties of matrices such as rank, inverse, Cholesky factors, etc. in connection with providing processing results. Existing techniques for determining these matrix properties often require large amounts of hardware resources and power to support the computationally intensive operations. It would be useful to simplify these analytical operations and make them more computationally efficient in order to conserve computational resources and power.

Further, in certain real-time applications (e.g., signal processing, cryptography, etc.), there are rather stringent speed requirements. Currently, the determination of properties for large matrices is often performed by large servers due to the processing requirements. It would also be useful to simplify the processing operations to allow them to execute on devices with less powerful processors and fewer memories (e.g., on personal computers, mobile phones, etc.).

Moreover, many existing techniques for determining matrix properties employ sequential processes that are not easily made parallelizable. The implementations of the techniques often do not readily take advantage of the multiprocessor architectures of modern computing platforms. Further, many existing techniques employ non-regular processes that require irregular data movements to/from memories, and therefore is typically implemented as software code running on general purpose processors rather than fast, specialized hardware.

BRIEF DESCRIPTION OF THE DRAWINGS

Various embodiments of the invention are disclosed in the following detailed description and the accompanying drawings.

FIGS. 3B-3G illustrate a numerical example where a matrix A whose rank is unknown.

FIGS. 4B-4K illustrate a numerical example for determining the inverse of a matrix.

FIG. 11 is a chart showing the estimated amounts of computations needed for obtaining various properties according to some embodiments of the present application.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

For large matrices, existing technique to obtain matrix properties such as rank, inverse, pseudoinverse, Cholesky factors, determinant, and singular values, are often computationally intensive, slow, and non-parallelizable. An improved iterative technique for obtaining matrix properties is described. The technique determines the properties through partitioning and transforming at least some of the properties iteratively.

Figure 1:
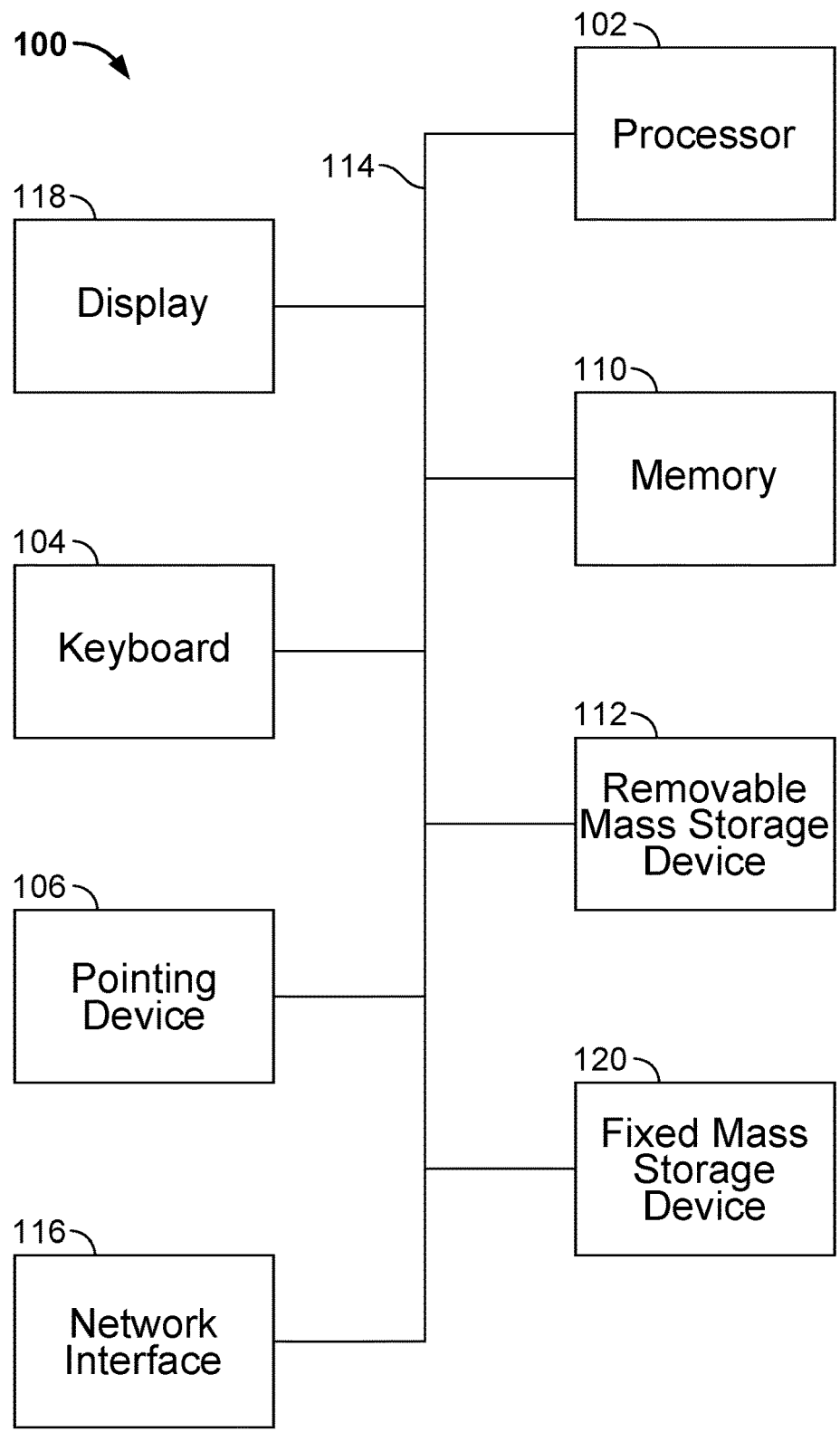
FIG. 1 is a block diagram illustrating an embodiment of a programmed computer system for processing matrices.

FIG. 1 is a block diagram illustrating an embodiment of a programmed computer system for processing matrices. As will be apparent, other computer system architectures and configurations can be used to determine matrix properties. Computer system 100, which includes various subsystems as described below, includes at least one processing subsystem (also referred to as a processor) 102. For example, processor 102 can be implemented by a single-chip processor or by multiple processors/cores operating on the same device or on multiple devices. In some embodiments, processor 102 includes one or more general purpose digital processors (e.g., one or more central processing units) that control the operation of the computer system 100. Using instructions retrieved from memory 110, the processor 102 controls the reception and manipulation of input data, and the output and display of data on output devices (e.g., display 118). In some embodiments, processor 102 includes one or more of: microprocessor, digital signal processor (DSP), field programmable gate array (FPGA), application specific integrated circuit (ASIC), one or more graphical processing units (GPU), and/or other appropriate circuit components. In some embodiments, processor 102 is implemented using one or more hardware components and/or virtual machines that are configured to execute in parallel. In some embodiments, processor 102 includes and/or is used to perform the processes described below with respect to FIGS. 2-9.

In this example, processor 102 is coupled bi-directionally with memory 110, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as is well known in the art, primary storage typically includes basic operating instructions, program code, data and objects used by the processor 102 to perform its functions (e.g., programmed instructions). For example, memory 110 can include any suitable computer-readable storage media, described below, depending on whether, for example, data access needs to be bi-directional or uni-directional. For example, processor 102 can also directly and very rapidly retrieve and store frequently needed data in a cache memory (not shown).

A removable mass storage device 112 provides additional data storage capacity for the computer system 100, and is coupled either bi-directionally (read/write) or uni-directionally (read only) to processor 102. For example, storage 112 can also include computer-readable media such as magnetic tape, flash memory, PC-CARDS, portable mass storage devices, holographic storage devices, and other storage devices. A fixed mass storage 120 can also, for example, provide additional data storage capacity. The most common example of mass storage 120 is a hard disk drive. Mass storage 112, 120 generally store additional programming instructions, data, and the like that typically are not in active use by the processor 102. It will be appreciated that the information retained within mass storage 112 and 120 can be incorporated, if needed, in standard fashion as part of memory 110 (e.g., RAM) as virtual memory.

In addition to providing processor 102 access to storage subsystems, bus 114 can also be used to provide access to other subsystems and devices. As shown, these can include a display monitor 118, a network interface 116, a keyboard 104, and a pointing device 106, as well as an auxiliary input/output device interface, a sound card, speakers, and other subsystems as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection as shown. For example, through the network interface 116, the processor 102 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Additional mass storage devices (not shown) can also be connected to processor 102 through network interface 116.

An auxiliary I/O device interface (not shown) can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 1 is but an example of a computer system suitable for use with the various embodiments disclosed herein. Other computer systems suitable for such use can include additional or fewer subsystems. For example, a cloud-based system comprising multiple servers can be used. In addition, bus 114 is illustrative of any interconnection scheme serving to link the subsystems. Other computer architectures having different configurations of subsystems can also be utilized.

Figure 2:
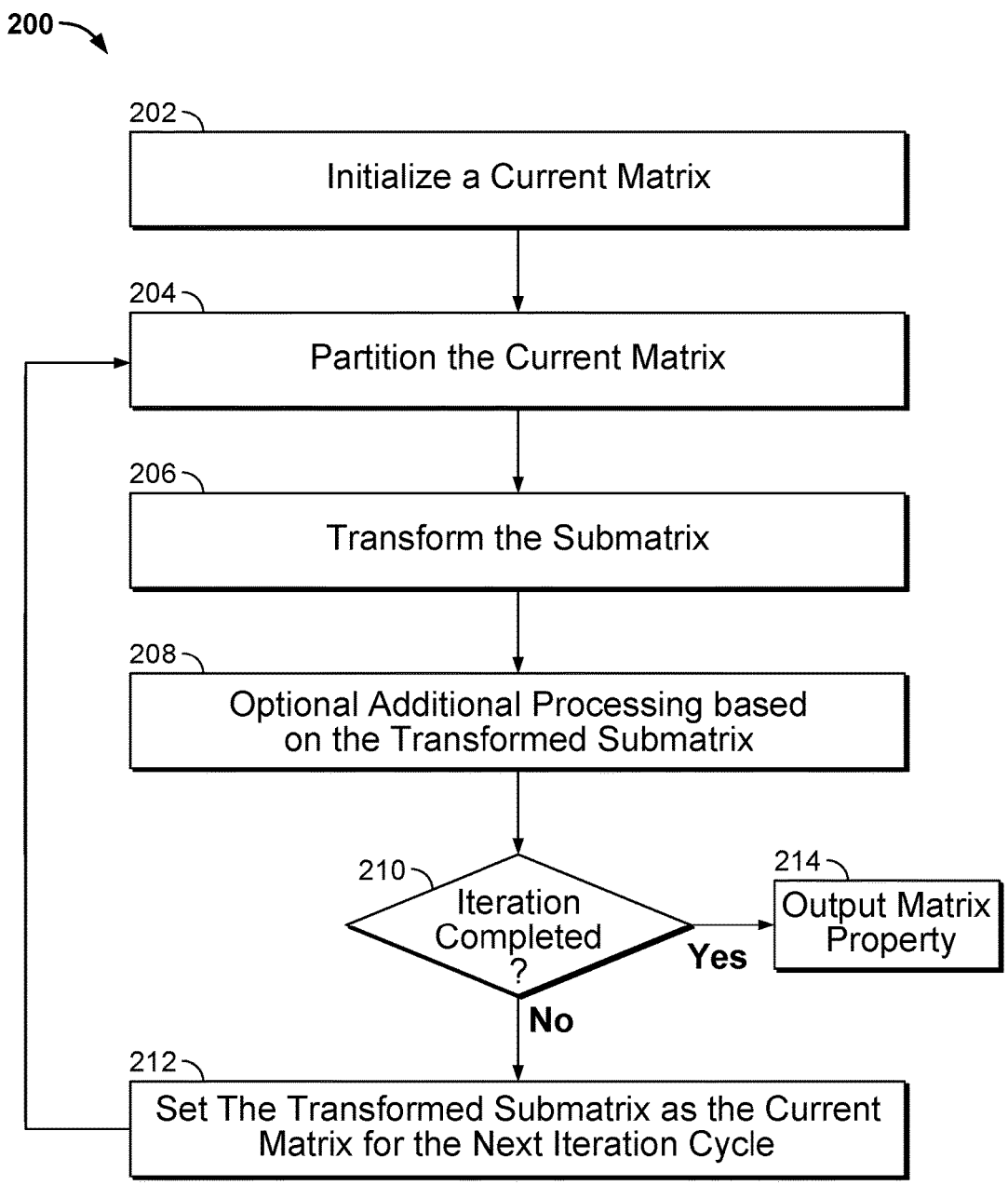
FIG. 2 is a flowchart illustrating an embodiment of an iterative matrix processing technique.

FIG. 2 is a flowchart illustrating an embodiment of an iterative matrix processing technique. Process 200 can be performed on a system such as 100.

At 202, a current matrix is initialized. As will be described in greater detail below, the current matrix can be initialized differently depending on implementation, and the initialized value is dependent on an original matrix whose property is to be determined. In some embodiments, the current matrix is initialized to correspond to the original matrix. In some embodiments, a new matrix is constructed using the original matrix, and the current matrix is initialized to correspond to the new matrix.

At 204-212, a matrix property of the original matrix is determined iteratively. Examples of the matrix property include the rank of the original matrix, the inverse of the original matrix, the determinant, the Cholesky factors of the original matrix, etc.

At 204, the current matrix is partitioned into a plurality of partitions. As will be discussed in greater detail below, the partitions include an upper-left partition, an upper-right partition, a lower-left partition, and a lower-right partition. The lower-right partition is also referred to as the submatrix.

At 206, the submatrix is transformed. Depending on implementation, the submatrix can be transformed differently. In some embodiments, the elements of the submatrix are replaced with the Schur complement of the upper-left partition in the current matrix. In some embodiments, the brackets are also modified. In some embodiments, the submatrix transformation is parallelizable. Specifically, certain transformation steps for the elements in the submatrix are performed independently (that is, without relying on transformed results from other elements), and therefore these steps can be performed on multiple processors in parallel. Compared with existing sequential processes for obtaining matrix properties, transforming the submatrix on multiple processors in parallel greatly reduces processing time and improves efficiency.

At 208, any additional processing based on the transformed submatrix is optionally performed. For example, intermediate processing results can be computed and stored for later use; additional manipulation of the transformed submatrix can take place, etc.

At 210, it is determined whether iteration is completed. In some embodiments, a condition is checked, and meeting the condition completes the iteration. In various embodiments, the condition includes: the diagonal elements of the submatrix being zero, the number of iteration cycle reaching a preset value, the elements of the singular value matrix are in descending order, etc.

When the iteration condition is met and the iteration is completed, the matrix property of the original matrix is obtained, and control proceeds to 214 to obtain the matrix from the result of the iteration, and output the matrix property.

If iteration has not been completed, the process continues to 212, where the transformed submatrix is set as the current matrix for the next iteration cycle. The process then return to 204, and the next iteration is carried out.

Once iteration is complete, at 214, the matrix property is output. Depending on implementation, the matrix property can be output to an analytics engine to be further processed, to a display to be presented, to a storage location to be saved for later use, etc.

Iteratively determining the matrix property by partitioning the current matrix and modifying the submatrix brings improved performance over many existing techniques for obtaining matrix properties. Computational time is greatly improved with the iterative approach. Further, because process 200 can be used to obtain different types of matrix properties, a core set of software functions (e.g., a base class in an object-oriented programming language) and/or a core set of hardware components (e.g., a basic cell in a hierarchical circuit design) can be implemented with modifications tailored for specific properties, making it easier to develop, verify and debug the software and/or hardware implementations for the improved process than conventional techniques. Moreover, the process is highly systolic, where data in the processing pipeline moves in an ordered, regular way, making the process more amenable to be implemented using specialized hardware such as ASIC, FPGA, GPU, etc., than existing techniques for obtaining matrix properties.

In some embodiments, the matrix property that is determined is the rank of the matrix. For large matrices (e.g., matrices with thousands or more rows), the existing technique of using Gaussian elimination (also known as row reduction) is often computationally intensive and slow. In some embodiments, process of 200 is used to find the rank while reducing the number of computations and improving performance for large matrices. Details of the process are described in connection with FIGS. 3A-3G.

Figure 3A:
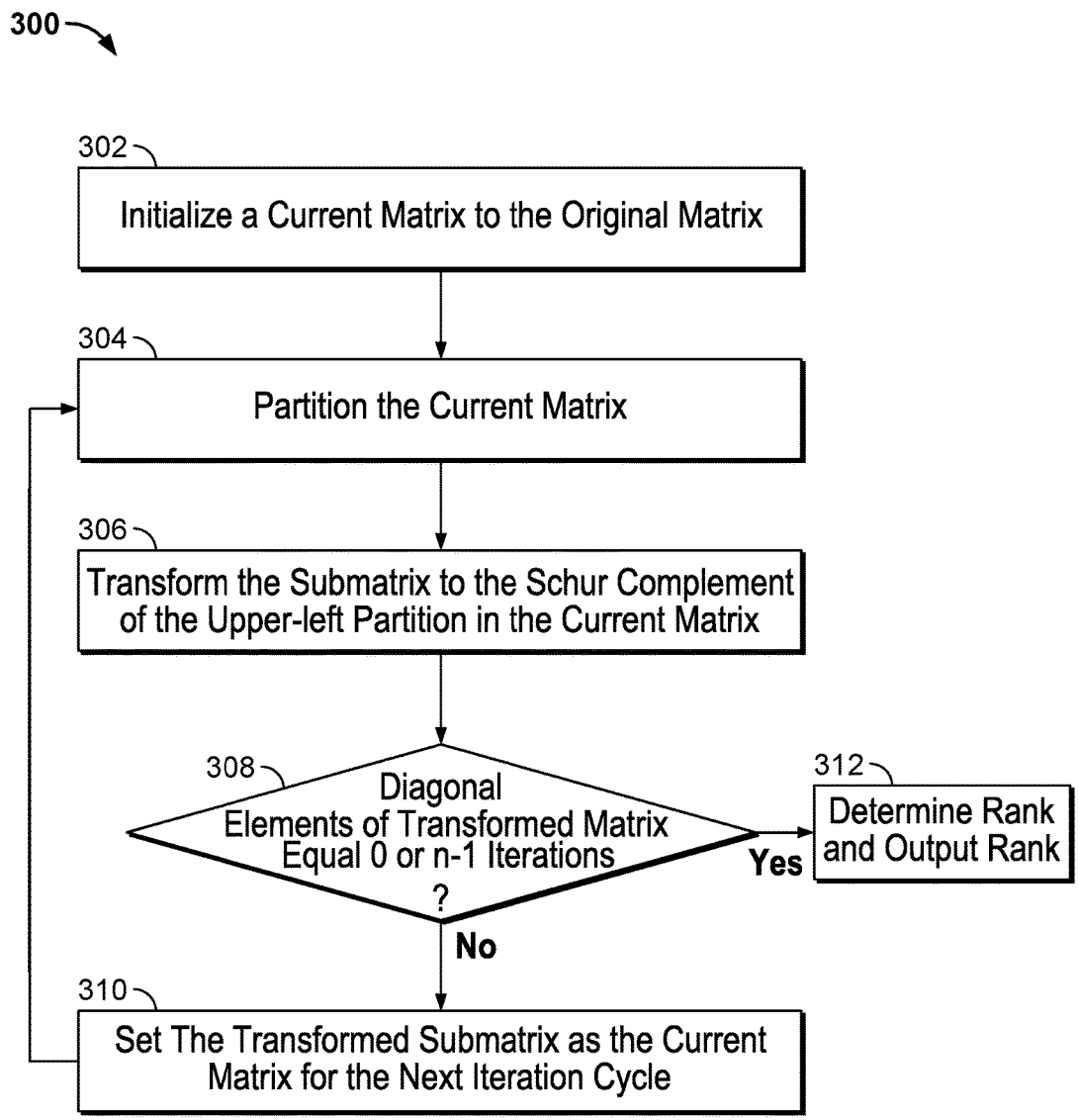
FIG. 3A is a flowchart illustrating an embodiment of an iterative matrix processing technique for determining the rank of a matrix.

FIG. 3A is a flowchart illustrating an embodiment of an iterative matrix processing technique for determining the rank of a matrix.

Process 300 can be performed on a system such as 100. The process improves computational efficiency and speed by reducing the amount of computations and providing parallelizable operations.

To facilitate the discussion of the process, the concept of Schur complement is described. Suppose that an n×n matrix R is partitioned as $$R = \begin{bmatrix} A & F \\ B & C \end{bmatrix}$$

where A is an r×r matrix, F, B and C are (n−r)×(n−r) matrices, where r and n are integers and r<n.

Then according to Nystrom formula, it is known that $$C = BA^{-1}F$$

The term $C - BA^{-1}F$ is the Schur complement of A in R. As will be explained more fully below, the Schur complement will be used to transform the submatrix in the iterative process.

At 302, a current matrix is initialized to correspond to the original matrix. In this case, the original matrix is an n×n matrix, where n is an integer. In this example, the original matrix is denoted as R and the current matrix is denoted as $R_0$.

$$\text{For example, } R_0 = R = \begin{bmatrix} r_{11} & r_{12} & r_{13} & r_{14} \\ r_{21} & r_{22} & r_{23} & r_{24} \\ r_{31} & r_{32} & r_{33} & r_{34} \\ r_{41} & r_{42} & r_{43} & r_{44} \end{bmatrix}$$

At 304-312, the matrix property of the original matrix is determined iteratively. In this case, the matrix property to be determined is the rank (r) of the original matrix. The rank of a matrix is the maximum number of linearly independent row vectors in the matrix or the maximum number of linearly independent column vectors in the matrix.

At 304, the current matrix is partitioned into a plurality of partitions. In this case, the matrix is divided into four partitions: an upper-left partition (in this case a scalar that corresponds to the element at position (1, 1) of the current matrix), an upper-right partition that corresponds to the row vector comprising elements from (1, 2) to (1, N) of the current matrix, a lower-left partition that corresponds to the column vector comprising elements from (2, 1) to (N, 1) of the current matrix, and a lower-right partition (also referred to as the submatrix) comprising the rest of the elements. The row vector and column vector partitions are also sometimes referred to as the "brackets" of the partitions.

Take $$R_0 = \begin{bmatrix} r_{11} & r_{12} & r_{13} & r_{14} \\ r_{21} & r_{22} & r_{23} & r_{24} \\ r_{31} & r_{32} & r_{33} & r_{34} \\ r_{41} & r_{42} & r_{43} & r_{44} \end{bmatrix}$$

as an example, the matrix is partitioned as follows:

$$\begin{bmatrix} [r_{11}] & [r_{12} \ r_{13} \ r_{14}] \\ \begin{bmatrix} r_{21} \\ r_{31} \\ r_{41} \end{bmatrix} & \begin{bmatrix} r_{22} & r_{23} & r_{24} \\ r_{32} & r_{33} & r_{34} \\ r_{42} & r_{43} & r_{44} \end{bmatrix} \end{bmatrix} = \begin{bmatrix} A_1 & F_1 \\ B_1 & C_1 \end{bmatrix}$$

At 306, the submatrix is transformed to correspond to the Schur complement of the upper-left partition (the scalar partition) in the current matrix. In the first iteration, the submatrix of $R_0$ (which is $C_1$) is transformed by subtracting from the submatrix the product of the scalar inverse $(A_1^{-1})$ and the outer product of the column vector $(B_1)$ and row vector $(F_1)$:

$$R_1 = \begin{bmatrix} r_{11} & r_{12} & r_{13} & r_{14} \\ r_{21} & r_{22} - \frac{1}{r_{11}}(r_{21}r_{12}) & r_{23} - \frac{1}{r_{11}}(r_{21}r_{13}) & r_{24} - \frac{1}{r_{11}}(r_{21}r_{14}) \\ r_{31} & r_{32} - \frac{1}{r_{11}}(r_{31}r_{12}) & r_{33} - \frac{1}{r_{11}}(r_{31}r_{13}) & r_{34} - \frac{1}{r_{11}}(r_{31}r_{14}) \\ r_{41} & r_{42} - \frac{1}{r_{11}}(r_{41}r_{12}) & r_{43} - \frac{1}{r_{11}}(r_{41}r_{13}) & r_{44} - \frac{1}{r_{11}}(r_{41}r_{14}) \end{bmatrix} = \begin{bmatrix} A_1 & F_1 \\ B_1 & C_1 - B_1 A_1^{-1} F_1 \end{bmatrix}$$

Given that each element in the submatrix is computed independently without relying on the results of other transformed elements, the computations can be performed on multiple processors in parallel, thus significantly reducing processing time.

At 308, to determine whether iteration is completed, the diagonal elements of transformed submatrix are examined. During the first iteration, if all diagonal elements are zero, then the determinant $\det[C_1 - B_1 A^{-1} F_1] = 0$, and the rank of R is 1.

If one or more diagonal elements of $C_1 - B_1 A^{-1} F_1$ are not zero, then the determinant $\det[C_1 - B_1 A^{-1} F_1] \neq 0$ and the rank of R is >1, and another iteration is needed.

At 310, the transformed submatrix is set as the current matrix for the next iteration cycle. The process returns to 304, wherein the current matrix (previous submatrix) is partitioned.

In other words, $C_1 - B_1 A_1^{-1} F_1$ is partitioned into $$\begin{bmatrix} A_2 & F_2 \\ B_2 & C_2 \end{bmatrix}.$$

In the next iteration cycle, at 306, the submatrix $C_2$ is transformed into $C_2 - B_2 A_2^{-1} F_2$.

At 308, the diagonal elements of $C_2 - B_2 A_2^{-1} F_2$ are examined. If they are all zero, then the rank of R is 2; otherwise $C_2 - B_2 A_2^{-1} F_2$ is set as the next submatrix, and another iteration is performed. In subsequent iterations, at an iteration cycle j, if the diagonal elements of $C_j - B_j A_j^{-1} F_j$ are all zero, then the rank of R is determined to be j and iteration is completed. Further, on reaching iteration cycle n−1, and the scalar $C_{n-1} - B_{n-1} A_{n-1}^{-1} F_{n-1} \neq 0$, then R has rank of n, and the iteration is completed.

At 312, the matrix rank is optionally output. Depending on implementation, the matrix property can be output to an analytics engine to be further processed, to a display to be presented, to a storage location to be saved for later use, etc. In some embodiments, the rank is used to determine whether R can be inverted. Strictly speaking, for an n×n matrix R, it is only invertible if R has a rank of n. If R has a rank lower than n, a pseudoinverse is determined instead of the inverse.

In some embodiments, the matrix property that is determined is the inverse of the matrix.

For example, encryption-decryption, control systems, telecommunications data receivers often need to solve linear equations such as A x=b, where the matrix A is known, the vector b is also known, and the coefficient vector x is unknown. The solution is $x = A^{-1} b$, and thus involves $A^{-1}$ which is the inverse of A. For example, given a sequence $W = [w_1 \ldots w_M]$ of distorted received signals transmitted over a wireless communications channel and the known proper and undistorted data that corresponds to this sequence being $G = [g_1 \ldots g_M]$ then, the distortion correction function of the communications channel can be computed by first finding the autocorrelation matrix of W:

$$w = E\{W^T W\} = E\left\{ \begin{bmatrix} w_1 \\ \vdots \\ w_M \end{bmatrix} [w_1 \ \cdots \ w_M] \right\}$$

and the vector of cross-correlation between W and G:

$$v = E\{W^T g_k\} = E\left\{ \begin{bmatrix} w_1 \\ \vdots \\ w_M \end{bmatrix} g_k \right\} = E\left\{ \begin{bmatrix} g_k w_1 \\ \vdots \\ g_k w_M \end{bmatrix} g_k \right\}$$

then finding the solution to the distortion function $D = W^{-1} V$.

FIGS. 3B-3G illustrate a numerical example where a matrix A whose rank is unknown. In FIG. 3B, the original matrix A is partitioned. The submatrix of the partition is W. In FIG. 3C, the submatrix W is transformed to W' based on the Schur complement. In FIG. 3D, submatrix W' is partitioned. In FIG. 3E, the submatrix of W' is transformed to obtain a transformed submatrix W". In FIG. 3F, the submatrix W" is partitioned. In FIG. 3G, the submatrix of submatrix W" is transformed. At this point, the transformed submatrix W'" has all zero diagonal elements. Thus, matrix A has a rank of 3.

Existing techniques for finding the inverse of a matrix typically rely on Gaussian elimination of the matrix. For large matrices, the existing technique is often computationally intensive, slow, and non-parallelizable. In some embodiments, process of 200 is used to find the rank while reducing the number of computations and improving performance for large matrices. Details of the process are described in connection with FIGS. 4A-4K.

Figure 4A:
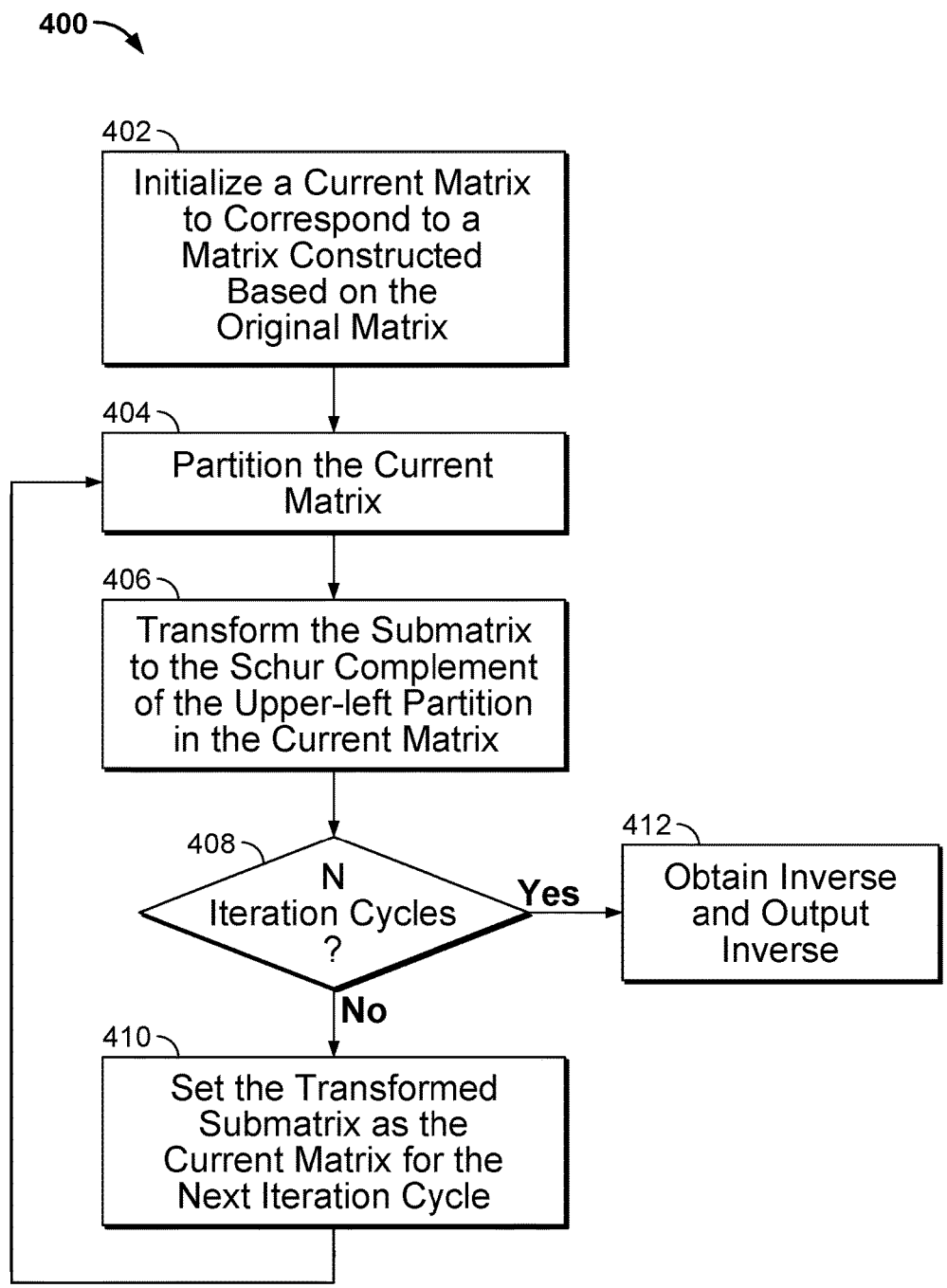
FIG. 4A is a flowchart illustrating an embodiment of an iterative matrix processing technique for obtaining the inverse of a matrix.

FIG. 4A is a flowchart illustrating an embodiment of an iterative matrix processing technique for obtaining the inverse of a matrix. Process 400 can be performed on a system such as 100.

In this example, it is assumed that the original matrix R is an n×n matrix.

At 402, a current matrix is initialized. In this example, a new matrix M is constructed using the original matrix R, and the current matrix is initialized to correspond to the new matrix. Specifically, the new matrix M is constructed as $$M = \begin{bmatrix} R & I \\ I & 0 \end{bmatrix}$$

where I is an n×n identity matrix, and 0 is an n×n zero matrix. The current matrix is initialized to correspond to the new matrix.

For instance, suppose that $$R = \begin{bmatrix} r_{11} & r_{12} & r_{13} & r_{14} \\ r_{21} & r_{22} & r_{23} & r_{24} \\ r_{31} & r_{32} & r_{33} & r_{34} \\ r_{41} & r_{42} & r_{43} & r_{44} \end{bmatrix}, \text{ then}$$

$$M = \begin{bmatrix} r_{11} & r_{12} & r_{13} & r_{14} & 1 & 0 & 0 & 0 \\ r_{21} & r_{22} & r_{23} & r_{24} & 0 & 1 & 0 & 0 \\ r_{31} & r_{32} & r_{33} & r_{34} & 0 & 0 & 1 & 0 \\ r_{41} & r_{42} & r_{43} & r_{44} & 0 & 0 & 0 & 1 \\ 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \end{bmatrix}.$$

At 404-410, the matrix property of the original matrix is determined iteratively. In this example, the matrix property is the inverse of the original matrix. The inverse is obtained after n iterations. In other words, the iteration condition is met once n iteration cycles are repeated.

In each iteration, at 404, the current matrix is partitioned into a plurality of partitions. In this case, the matrix is divided into four partitions: an upper-left partition that is a scalar and corresponds to the element at position (1, 1) of the current matrix, an upper-right partition that corresponds to the row vector comprising elements from (1, 2) to (1, N) of the current matrix, a lower-left partition that corresponds to the column vector comprising elements from (2, 1) to (N, 1) of the current matrix, and a lower-right partition (also referred to as the submatrix) comprising the rest of the elements.

At 406, the submatrix is transformed to correspond to the Schur complement of the upper-left partition in the current matrix. In the first iteration, the submatrix $C_1$ is transformed by subtracting from the submatrix the product of the scalar inverse $(A_1^{-1})$ and the outer product of the column vector $(B_1)$ and row vector $(F_1)$.

For the example of 4×4 matrix R described above, the product of the scalar inverse and the outer product of the column vector and row vector is:

$$\frac{1}{r_{11}} \begin{bmatrix} r_{21} \\ r_{32} \\ r_{41} \\ 1 \end{bmatrix} \begin{bmatrix} r_{12} & r_{13} & a_{14} & r \end{bmatrix} =$$

$$\frac{1}{r_{11}} \begin{bmatrix} r_{21}r_{12} & r_{21}r_{13} & r_{21}r_{14} & r_{21} \\ r_{31}r_{12} & r_{31}r_{13} & r_{31}r_{14} & r_{31} \\ r_{41}r_{12} & r_{41}r_{13} & r_{41}r_{13} & r_{41} \\ r_{12} & r_{13} & r_{14} & 1 \end{bmatrix} = \begin{bmatrix} \frac{r_{21}r_{12}}{r_{11}} & \frac{r_{21}r_{13}}{r_{11}} & \frac{r_{21}r_{14}}{r_{11}} & \frac{r_{21}}{r_{11}} \\ \frac{r_{31}r_{12}}{r_{11}} & \frac{r_{31}r_{13}}{r_{11}} & \frac{r_{31}r_{14}}{r_{11}} & \frac{r_{31}}{r_{11}} \\ \frac{r_{41}r_{12}}{r_{11}} & \frac{r_{41}r_{13}}{r_{11}} & \frac{r_{41}r_{13}}{r_{11}} & \frac{r_{41}}{r_{11}} \\ \frac{r_{12}}{r_{11}} & \frac{r_{13}}{r_{11}} & \frac{r_{14}}{r_{11}} & \frac{1}{r_{11}} \end{bmatrix}$$

Note that elements with values of 0 are omitted because the corresponding elements in the outer product would also be 0.

The resulting transformed matrix is:

$$M_1 = \begin{bmatrix} r_{11} & r_{12} & r_{13} & r_{14} & 1 & 0 & 0 & 0 \\ r_{21} & r_{22}-\frac{1}{r_{11}}(r_{21}r_{12}) & r_{23}-\frac{1}{r_{11}}(r_{21}r_{13}) & r_{24}-\frac{1}{r_{11}}(r_{21}r_{14}) & -\frac{1}{r_{11}}(r_{21}) & 1 & 0 & 0 \\ r_{31} & r_{32}-\frac{1}{r_{11}}(r_{31}r_{12}) & r_{33}-\frac{1}{r_{11}}(r_{31}r_{13}) & r_{34}-\frac{1}{r_{11}}(r_{31}r_{14}) & -\frac{1}{r_{11}}(r_{31}) & 0 & 1 & 0 \\ r_{41} & r_{42}-\frac{1}{r_{11}}(r_{41}r_{12}) & r_{43}-\frac{1}{r_{11}}(r_{41}r_{13}) & r_{44}-\frac{1}{r_{11}}(r_{41}r_{14}) & -\frac{1}{r_{11}}(r_{41}) & 0 & 0 & 1 \\ 1 & -\frac{1}{r_{11}}(r_{12}) & -\frac{1}{r_{11}}(r_{13}) & -\frac{1}{r_{11}}(r_{14}) & -\frac{1}{r_{11}} & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \end{bmatrix}$$

Given that each element in the submatrix is computed independently without relying on the results of other transformed elements, the computations can be performed on multiple processors in parallel to reduce processing time.

Note that the first element of the lower right quadrant $$\left(\text{that is, the element at }(5, 5)\text{ with the value of } -\frac{1}{r_{11}}(r12)\right)$$

is the inverse of the upper-left partition.

At 408, it is determined whether iteration is completed. In this example, the iteration condition is met and the iteration completes when n iteration cycles have been repeated.

When the iteration is completed, the inverse of the original matrix is obtained as the lower right submatrix of the current matrix, and control proceeds to 412 to output the matrix property.

If iteration has not been completed, the process continues to 410, where the transformed submatrix is set as the current matrix for the next iteration cycle. The process then return to 404, and the next iteration is carried out.

At the j-th iteration cycle, $$M_j = \begin{bmatrix} \hat{R}_j & W_{2,j} \\ W_{1,j} & 0 - I_{j-1}R_j^{-1}I_{j-1} \end{bmatrix} = \begin{bmatrix} \hat{R}_j & W_{2,j} \\ W_{1,j} & R_j^{-1} \end{bmatrix}$$

where $R_j^{-1}$ is the inverse of the j'th major sub-matrix of R.

At the n-th iteration cycle, $$M_n = \begin{bmatrix} R_n & W_2 \\ W_1 & 0 - IR^{-1}I \end{bmatrix} = \begin{bmatrix} R_n & W_2 \\ W_1 & R^{-1} \end{bmatrix}$$

Thus, the inverse can be obtained from the current matrix by taking the lower-right matrix.

In the previous example, after the first iteration, the transformed submatrix (which includes elements starting in row 2, column 2) is used as the current matrix for partitioning at 404 and transforming at 406. After two more iterations, the 4×4 bottom right sub-matrix will be a sum of rank-1 matrices, each of which is an outer product of vectors, each vector a result of iterative processing. That is, $$R^{-1} = R_1^{-1} + R_2^{-1} + R_3^{-1} + R_4^{-1}$$

where $R_1^{-1}$ is the inverse of element (1, 1) of R, $R_1^{-1} + R_2^{-1}$ is the inverse of submatrix (1:2, 1:2) of R, $R_1^{-1} + R_2^{-1} + R_3^{-1}$ is the inverse of submatrix (1:3, 1:3) of R, and $R_1^{-1} + R_2^{-1} + R_3^{-1} + R_4^{-1}$ is the inverse of R.

Once iteration is complete, at 412, the matrix property including the inverse is output. Depending on implementation, the matrix property can be output to another process such as 500 to obtain other matrix properties, to an analytics engine to be further processed, to a display to be presented, to a storage location to be saved for later use, etc.

FIGS. 4B-4K illustrate a numerical example for determining the inverse of a matrix.

FIG. 4B shows the initial matrix A that is constructed based on the original matrix R. This can be viewed as creating an artificially rank-deficient matrix of rank 4. In FIG. 4C, the initial matrix is partitioned and the submatrix is W. In FIG. 4D, W is transformed into W' using the Schur complement. In FIG. 4E, W' is partitioned. In FIG. 4F, the submatrix that is a partition of W' is transformed to obtain W''. In FIG. 4G, W'' is partitioned. In FIG. 4H, the submatrix that is a partition of W'' is transformed to obtain W'''. In FIG. 4I, W''' is partitioned. In FIG. 4J, the submatrix that is a partition of W''' is transformed to obtain W''''. In FIG. 4K, W'''' is partitioned, and the submatrix W''''' corresponds to the inverse of the original matrix R.

In another aspect, for an R that is a symmetric positive definite (SPD) matrix, a byproduct of the matrix inversion process 400 includes R's Cholesky decomposition, which has the form of $$R = LL'$$

where L is a lower triangular matrix with real and positive diagonal entries, and L' is the conjugate transpose of L (sometimes L' is also expressed as $L^T$ At the end of the iterations of process 400 (e.g., at 412), the resulting matrix is $$M_n = \begin{bmatrix} R_n & W_2 \\ W_1 & R^{-1} \end{bmatrix} = \begin{bmatrix} R_n & W_1' \\ W_1 & R^{-1} \end{bmatrix}$$

where $R = W_1^{-T}DW_1^{-1} = \hat{L}D\ \hat{L}' = \hat{L}D^{1/2}D^{1/2}\hat{L}' = LL'$ where $\hat{L}$ is the Cholesky lower triangular factor with unity diagonal, and L is the Cholesky lower triangular factor with non-unity diagonal (the diagonal is equal to $D^{1/2}$).

Similarly, for the inverse $R^{-1}$, $$R^{-1} = W_1^T D^{-1} W_1 = \hat{L}^{-T} D^{-1} \hat{L}^{-1} = \hat{L}^{-T} D^{-1/2} D^{-1/2} \hat{L}^{-1} = L^{-T} L^{-1}$$

where $L^{-T}$ is the transpose of $L^{-1}$.

If the initial matrix is set to $$M_1 = \begin{bmatrix} A & I \\ I & 0 \end{bmatrix}$$

wherein A is a matrix that is not necessarily SPD, then at the end of the iteration cycles we have $$M_n = \begin{bmatrix} LL' & L^{-1} \\ L^{-T} & A^{-1} \end{bmatrix}$$

The Cholesky factor L can be computed using entries in $M_n$, as LL'. $L^{-T}$. Since L is a triangular matrix, the multiplication is done quickly.

In another aspect, the matrix inversion process 400 can be generalized as follows:

Let the original matrix be R and the constructed matrix be $$M = \begin{bmatrix} R & S \\ H & V \end{bmatrix}$$

After n iterations, the resulting matrix is $$M_n = \begin{bmatrix} R_n & W_2 S \\ HW_1 & V - HR^{-1}S \end{bmatrix}$$

This process provides a fast, efficient, and highly parallelizable way to compute the solutions for certain equations, such as V−H $R^{-1}$ S, H $R^{-1}$ S (assuming that V is set to 0), and $R^{-1}$ S (if H is further set to identity and the equation to be solved is Rx=S or equivalently x=$R^{-1}$S).

Figure 5:
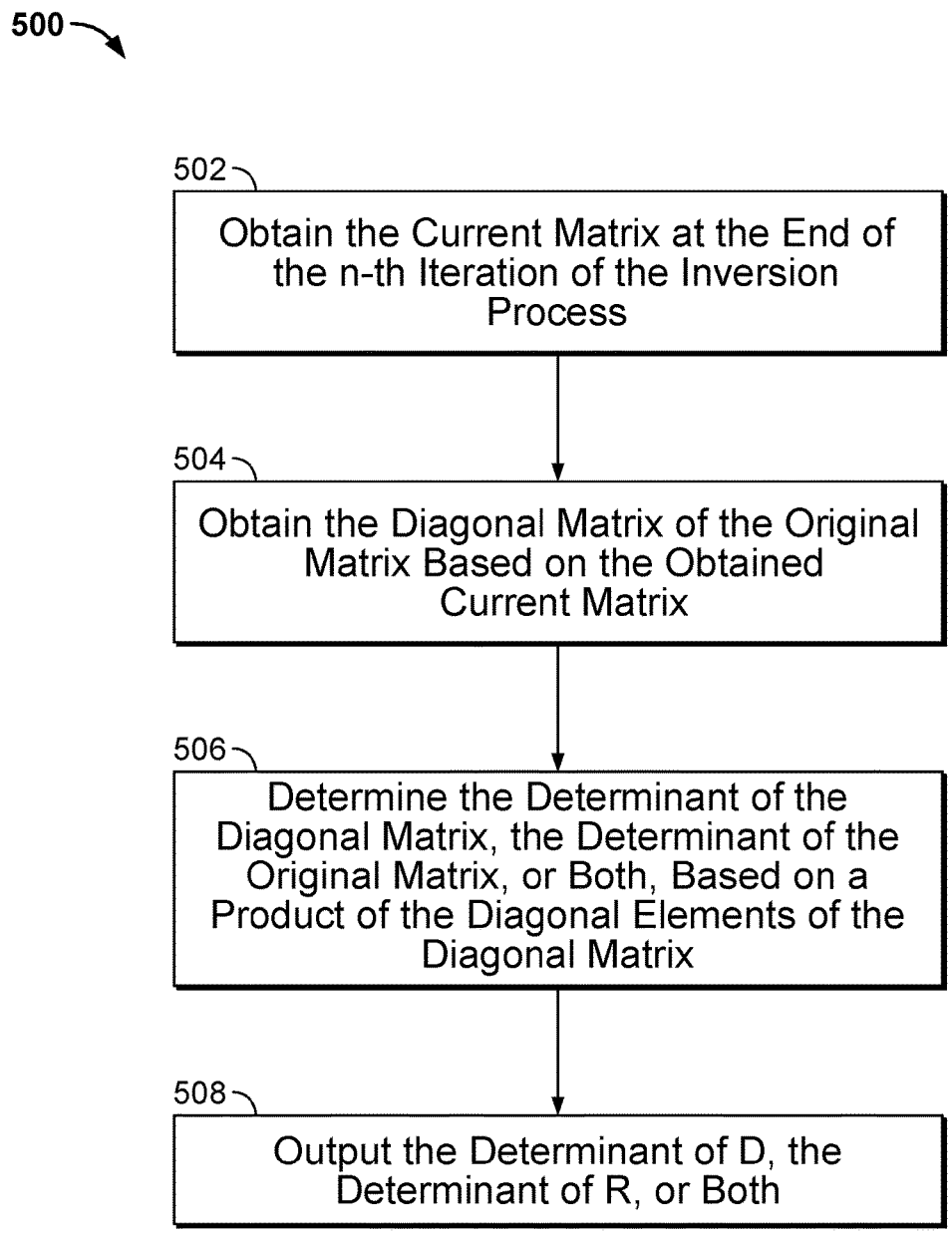
FIG. 5 is flowchart illustrating an embodiment of a process for obtaining a determinant of a matrix.

FIG. 5 is flowchart illustrating an embodiment of a process for obtaining a determinant of a matrix.

Process 500 can be performed after the inverse of the matrix is determined using process 400.

At 502, the current matrix at the end of the n-th iteration of the inversion process is obtained. The current matrix can be obtained by performing process 400.

This current matrix has the form:

$$M_n = \begin{bmatrix} R_n & W_2 \\ W_1 & R^{-1} \end{bmatrix}$$

where $W_2$ R $W_1$=D.

In other words, $$R = W_2^{-1} D W_1^{-1} = LDU$$

which is the LDU factorization of R, where L is the lower triangular matrix with unity diagonal, U is the upper triangular matrix with unity diagonal, and D is the diagonal matrix. It follows that $$R^{-1} = W_1 D^{-1} W_2 = U^{-1} D^{-1} L^{-1}$$

which is the LDU factorization of $R^{-1}$

It also follows that $$R^{-1} = W_1 D^{-1} W_2 = w_{1,1} d_1^{-1} w_{2,1} + w_{1,2} d_2^{-1} w_{2,2} + \ldots + w_{1,n} d_n^{-1} w_{2,n}$$

where $w_{1,j}$ is the j'th column of $W_1$ and $w_{2,j}$ is the j'th row of $W_2$, and $d_j^{-1}$ is the j'th diagonal element of $D^{-1}$. In particular, $$R^{-1} = W_1 D^{-1} W_2 = \underbrace{\underbrace{\underbrace{w_{1,1} d_1^{-1} w_{2,1}}_{R_1^{-1}} + w_{1,2} d_2^{-1} w_{2,2}}_{R_2^{-1}} + \ldots + w_{1,n} d_n^{-1} w_{2,n}}_{R^{-1}}$$

where $R_j^{-1}$ is the inverse of the j'th leading sub-matrix of R.

Consequently, $R_1$ can be written in the following form:

$$R_j = W_{2,j}^{-1} D_j W_{1,j}^{-1} = L_j D_j U_j$$

where $W_{2,j}^{-1} D_j$, and $W_{1,j}^{-1}$ are the leading j'th sub-matrices of $W_2^{-1}$, D, and $W_1^{-1}$ respectively, and $R_j$ is the leading j'th sub-matrix of R, and $L_j$ and $U_j$ are the leading sub-matrices of L and U respectively.

At the conclusion of the inversion iteration (process 400) the matrix in the upper left quadrant is $\hat{R}_n$ whose diagonal is D which is the diagonal matrix in the LDU decomposition, therefore an explicit computation of D is not required since the element values are available.

Thus, at 504, the diagonal matrix D of the original matrix R is obtained using equation $W_2$ R $W_1$=D based on terms in the current matrix $M_n$.

At 506, the determinant of D as well as the determinant of R can be obtained as follows:

$$\det(D) = \Pi_{j=1}^n d_{jj} = \det(R)$$

Therefore, process 500 computes the determinant of any size matrix by using the LDU factorization and then finding the product of the diagonal elements of D.

At 508, the determinant of D, the determinant of R, or both are output. The values can be output to an analytics engine or computation engine to be further processed, to a display to be presented, to a storage location to be saved for later use, etc.

Compared with existing techniques of obtaining determinant (which typically involve continuously multiplying and subtracting rows of the matrices), process 500 is computationally more efficient and faster for large matrices.

In some embodiments, the matrix property that is obtained includes the Cholesky factor.

Figure 6:
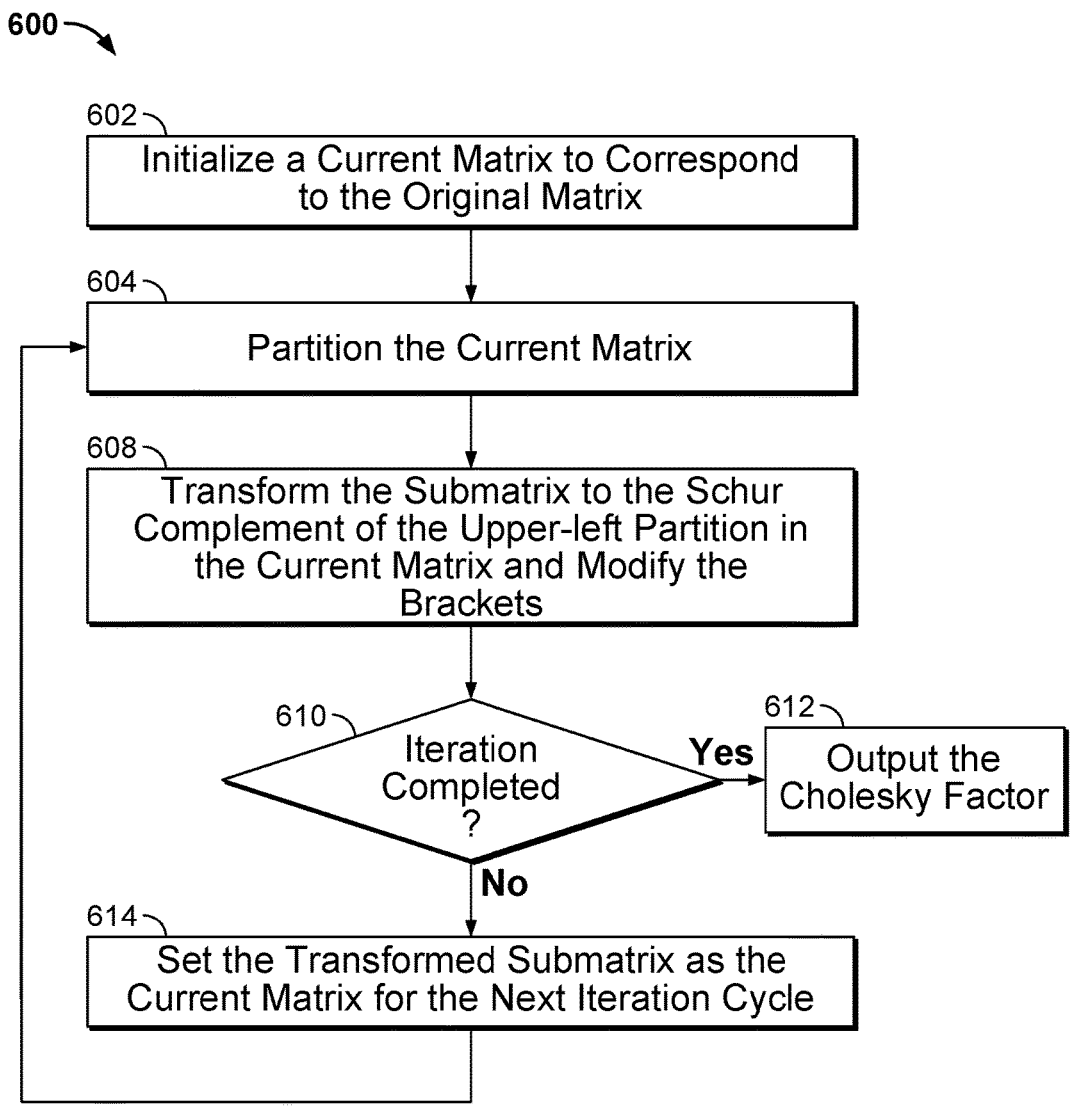
FIG. 6 is flowchart illustrating another embodiment of a process for obtaining the Cholesky factors of a matrix.

FIG. 6 is flowchart illustrating another embodiment of a process for obtaining the Cholesky factors of a matrix.

Existing Cholesky decomposition techniques usually require the matrix to be tridiagonal. Process 600 does not have this restriction and is generally applicable to symmetric positive definite (SPD) matrices.

It is assumed that for this process, the original matrix A is an SPD matrix. Cholesky decomposition is possible for SPD matrices. An original matrix A can be decomposed into its Cholesky factors A=L L' (where L is the lower triangular matrix with positive diagonal elements) using an iterative process 600.

At 602, the current matrix is initialized to correspond to a matrix constructed based on the original matrix A. Specifically, the current matrix is constructed as:

$$A_0 = \begin{bmatrix} A & I \\ I & 0 \end{bmatrix}$$

At 604, the current matrix is partitioned in a manner similar to 404 of process 400, into a scalar, a row vector and a column vector (also referred to as the brackets), and a submatrix.

In the first iteration, the current matrix is partitioned as $$A = \begin{bmatrix} a_{11} & \vec{a}_1' \\ \vec{a}_1 & A_{22} \end{bmatrix}$$

where $a_{11}$ is the scalar, $\vec{a}_1$ is the column vector, $\vec{a}_1'$ is the row vector, and $A_{22}$ is the submatrix. Specifically, $$\vec{a}_1 = \begin{bmatrix} a_{12} \\ a_{13} \\ \vdots \\ 1 \\ 0 \\ 0 \end{bmatrix} \text{ and } A_{22} = \begin{bmatrix} a_{22} & a_{23} & \cdots & 1 & 0 & 0 \\ a_{23} & \ddots & & 0 & 1 & 0 \\ \vdots & & a_{nn} & 0 & 0 & 1 \\ 1 & 0 & & 0 & 0 & 0 \\ 0 & 1 & & 0 & 0 & 0 \\ 0 & 0 & 1 & 0 & 0 & 0 \end{bmatrix}$$

Note that the Cholesky decomposition of the matrix can be written and similarly partitioned as:

$$A = LL' = \begin{bmatrix} l_{11} & \vec{0}_1' \\ \vec{l}_1 & L_{22} \end{bmatrix} \begin{bmatrix} l_{11} & \vec{l}_1' \\ \vec{0}_1 & L_{22}' \end{bmatrix} = \begin{bmatrix} l_{11}^2 & l_{11} \vec{l}_1' \\ l_{11} \vec{l}_1 & L_{22} L_{22}' + \vec{l}_1 \vec{l}_1' \end{bmatrix}$$

From this, it is known that $$a_{11} = l_{11}^2$$

$$\vec{a}_1 = l_{11} \vec{l}_1$$

$$A_{22} = L_{22}L_{22}' + \vec{l}_1 \vec{l}_1{}'$$

Accordingly, $$l_{11} = \sqrt{a_{11}}$$

$$\vec{l}_1 = \frac{\vec{a}_1}{l_{11}}$$

$$L_{22}L'_{22} = A_{22} - \vec{l}_1 \vec{l}_1{}'$$

At 608, the current matrix is transformed. In a manner similar to 406 of process 400, the submatrix is replaced with the Schur complement of the scalar partition in the current matrix. Additionally, the brackets (that is, the row and column vectors) of the current matrix is divided by the square root of the scalar partition $\sqrt{a_{jj}}$.

At the first iteration, the overall transformed matrix is $$A_{11} = \begin{bmatrix} \sqrt{a_{11}} & \frac{1}{\sqrt{a_{11}}} \vec{a}_1' \\ \frac{1}{\sqrt{a_{11}}} \vec{a}_1 & A_{22} - \frac{1}{a_{11}} \vec{a}_1 \vec{a}_1' \end{bmatrix}$$

At the j-th iteration (where j<n), $$A_{jj} = \begin{bmatrix} a_{jj} & \vec{a}_j' \\ \vec{a}_j & A_{j+1,j+1} \end{bmatrix} = \begin{bmatrix} l_{jj}^2 & l_{jj}\vec{l}_j' \\ l_{jj}\vec{l}_j & L_{j+1,j+1}L'_{j+1,j+1} + \vec{l}_j \vec{l}_j' \end{bmatrix}$$

Accordingly, $$l_{jj} = \sqrt{a_{jj}}$$

$$\vec{l}_j = \frac{\vec{a}_j}{l_{jj}}$$

$$L_{j+1,j+1}L'_{j+1,j+1} = A_{j+1,j+1} - \vec{l}_j \vec{l}_j'$$

Because A is symmetric, the transform only requires computing half of the terms, and the remaining half can be obtained by mirroring the results.

At 610, it is determined whether there have been n iteration cycles. If n iteration cycles have not been reached, the process proceeds to 614, and the transformed submatrix is set as the current matrix for the next iteration cycle.

If n iterations have been performed at 610, the iteration process completes. At 612, the Cholesky factor is determined based on the last current matrix, which has the form of $$\begin{bmatrix} LL' & L^{-1} \\ L^{-T} & A^{-1} \end{bmatrix}$$

The Cholesky factor L can be computed using entries in $M_n$ as $$L = LL' \cdot L^{-T}.$$

Since L is a triangular matrix, the multiplication is done quickly.

The above process assumes that the matrix being processed is SPD. To find the Cholesky factor for a non-symmetric matrix, the transformation is slightly altered to adjust for the sign of the scalar entries. For example, in the first iteration, $$A = \begin{bmatrix} a_{11} & \vec{a}'_{R1} \\ \vec{a}_{C1} & A_{22} \end{bmatrix} = \begin{bmatrix} s|a_{11}|^{\frac{1}{2}} & \vec{0}'_1 \\ \vec{l}_{C1} & L_{C22} \end{bmatrix} \begin{bmatrix} |a_{11}|^{\frac{1}{2}} & \vec{l}'_{R1} \\ \vec{0}_1 & L'_{R22} \end{bmatrix} =$$

$$\begin{bmatrix} l_{11}^2 & s|a_{11}|^{\frac{1}{2}}\vec{l}_1' \\ |a_{11}|^{\frac{1}{2}}\vec{l}_{C1} & L_{C22}L'_{R22} + \vec{l}_{C1}\vec{l}'_{R1} \end{bmatrix}$$

$$l_{11} = \sqrt{a_{11}}$$

$$\vec{l}_{C1} = \frac{\vec{a}_{C1}}{|a_{11}|^{1/2}}$$

$$\vec{l}'_{R1} = \frac{\vec{a}_{R1}}{s|a_{11}|^{1/2}}$$

$$L_{C22}L'_{R22} = A_{22} - \vec{l}_{C1}\vec{l}'_{R1}$$

In some cases, after the Cholesky decomposition of an original matrix is performed, the original matrix may become updated in a certain way and the Cholesky decomposition of the updated matrix is desired. The updated Cholesky decomposition can be obtained based on the Cholesky factors of the original matrix and the modifications.

For example, assuming that $A_{11}$ has a Cholesky decomposition $L_{11} L_{11}'$, and is modified to be $A_{22}$ with the addition of a column w, a row vector w', and a scalar c as follows:

$$A_{22} = \begin{bmatrix} A_{11} & w \\ w' & c \end{bmatrix} = \begin{bmatrix} L_{11}L'_{11} & w \\ w' & c \end{bmatrix} =$$

$$L_{22}L'_{22} = \begin{bmatrix} L_{11} & \vec{0} \\ \vec{l}'_1 & \gamma_1 \end{bmatrix} \begin{bmatrix} L'_{11} & \vec{l}_1 \\ \vec{0}' & \gamma_1 \end{bmatrix} = \begin{bmatrix} L_{11}L'_{11} & L_{11}\vec{l}_1 \\ \vec{l}'_1 L'_{11} & \vec{l}'_1 \vec{l}_1 + \gamma^2 \end{bmatrix}$$

where $\vec{0}$ is a n×1 zero vector, $l_1$ is an n×1 vector, and $\gamma_1$ is scalar.

The new quantities in the decomposition are:

$$l_1 = L_{11}^{-1} w$$

and $$\gamma_1 = \sqrt{c - \vec{l}_1' \vec{l}_1}$$

One application of the Cholesky decomposition is for extracting eigenvalues of a symmetric positive definite matrix. For an SPD matrix, its eigenvalues are the same as its singular values, and the process of extracting the eigenvalues is also referred to as singular value decomposition (SVD). The eigenvalues/singular values are used in applications such as image processing, facial recognition, search, product recommendation, search, etc. For large matrices, existing techniques for Cholesky-based SVD often take a long time to converge. A technique that achieves faster convergence is explained in connection with FIG. 7.

Figure 7:
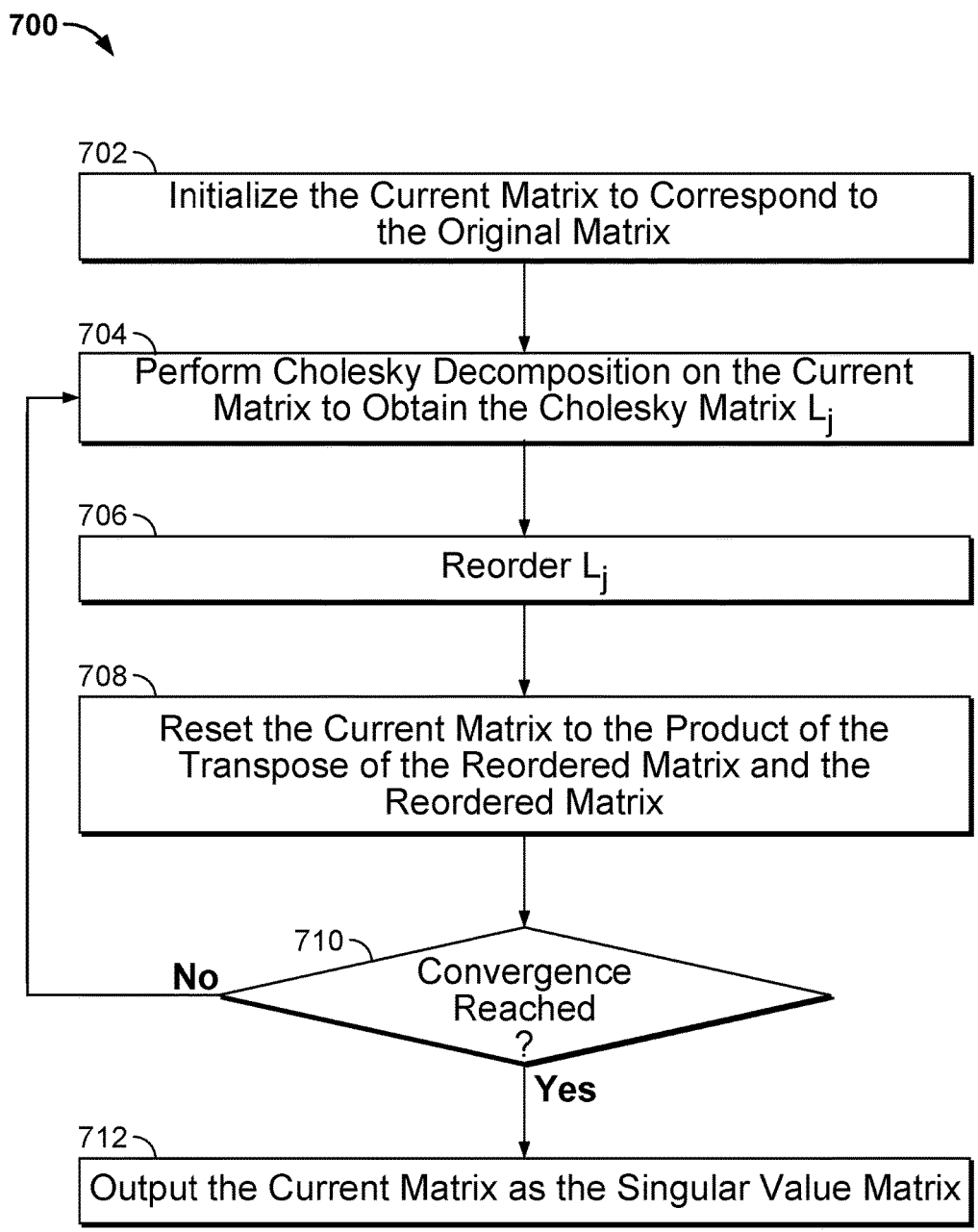
FIG. 7 is a flowchart illustrating an embodiment of a Cholesky-based singular value decomposition process that achieves fast convergence.

FIG. 7 is a flowchart illustrating an embodiment of a Cholesky-based singular value decomposition process that achieves fast convergence. Process 700 can be performed on a system such as 100.

Let R be a symmetric positive definite matrix and let the SVD and the Cholesky decomposition of R be $$R = U\Sigma U' = U\Sigma^{\frac{1}{2}}\Sigma^{\frac{1}{2}}U' = LL'$$

Accordingly, L can be expressed as a function of its SVD:

$$L = U\Sigma^{\frac{1}{2}}E'$$

where U is the same principal vector matrix as in the SVD of R, and E is the right principal vector matrix of L that "rotates" U into a lower triangular matrix modulated (multiplied) by $\Sigma^{1/2}$.

At 702, a current matrix $R_1$ is initialized to correspond to the original matrix R.

Iteration starts at 704. At 704, a Cholesky decomposition is performed on the current matrix $R_j$ to obtain the corresponding Cholesky factor $L_j$ such that $R_j = L_j L_j'$.

In other words, $$L_j = \text{Cholesky}(R_j)$$

Any appropriate Cholesky function can be applied, such as process 600 described above, the chol( ) function in Matlab, or any other appropriate implementations.

As the process proceeds, often the diagonal elements of E are not yet in descending order, and element $\Sigma_{jj}$ is smaller than element $\Sigma_{j+m\ j+m}$, and the process takes a long time to eventually exit this local minimum until eventually total convergence is achieved. To overcome the problem, 706 is performed.

At 706, $L_j$ is optionally reordered to obtain $\hat{L}_j$. The reordering improves convergence speed.

Specifically, the order index of the diagonal elements of $L_j$ is determined according to descending values of the diagonal elements, and the order index is used to form a permutation matrix $P_j$ that is multiplied with $L_j$ to find $\hat{L}_j = P_j L_j$. The resulting $\hat{L}_j$ reorders the columns of $L_j$ in a manner corresponding to having ordered diagonal elements. The iteration proceeds using $\hat{L}_j$ instead of $L_j$.

706 is not required to be performed at each iteration cycle and can be invoked at pre-specified time. For example, $L_j$ can be updated every 5 iteration cycles. Different intervals can be used in other embodiments. Because reordering columns (or rows) does not affect a matrix's eigenvalues, the reordering does not affect the ultimate solution of the eigenvalues, but speeds up the convergence significantly. If 706 were omitted, the process would still find the solution, but convergence would be reached more slowly.

At 708, the current matrix is reset to the product of $\hat{L}_j'$ (the transpose of $\hat{L}_j$) and $\hat{L}_j$ as follows:

$$R_j = \hat{L}_j' \hat{L}_j$$

Note that after each reordering of the columns, $\hat{L}_j$ is not lower triangular anymore, but $\hat{L}_j' \hat{L}_j$ is still symmetric positive definite, and the process proceeds to the next step of finding $L_{j+1}$, reordering, and finding $L_{j+1}' \hat{L}_{j+1}$, and so on.

At 710, it is determined whether convergence has been achieved. Convergence is achieved when the non-diagonal elements of the current matrix are zero or substantially close to zero (e.g., within a threshold of zero). In other words, convergence is reached when the current matrix is or is approximately a diagonal matrix. The dynamics of the iteration are such that the rate of increase in the upper diagonal element values is always greater than that of the lower diagonal elements which causes the final convergence to be an ordered set of diagonal principal values.

If convergence has not been achieved, the process returns to 704 to repeat the next iteration cycle.

Take for example an initial $$R = L_0 L_0' = U_0 \Sigma^{\frac{1}{2}} E_0' E_0 \Sigma^{\frac{1}{2}} U_0'$$

In the first iteration, at 706, $$R_1 = L_0' L_0 = E_0 \Sigma^{\frac{1}{2}} U_0' U_0 \Sigma^{\frac{1}{2}} E_0' = E_0 \Sigma^{\frac{1}{2}} \Sigma^{\frac{1}{2}} E_0' = L_1 L_1' = U_1 \Sigma^{\frac{1}{2}} E_1' E_1 \Sigma^{\frac{1}{2}} U_1'$$

In the next iteration, at 706, $$R_2 = L_1' L_1 = E_1 \Sigma^{1/2} U_1' U_1 \Sigma^{1/2} E_1' = E_1 \Sigma^{1/2}$$
$$\Sigma^{1/2} E_1' = L_2 L_2' = U_2 \Sigma^{1/2} E_2' E_2 \Sigma^{1/2} U_2'$$

and so on.

If convergence is achieved, $$R_m = L_m' L_m = I \Sigma^{1/2} U_m' U_m \Sigma^{1/2} I = I \Sigma^{1/2} \Sigma^{1/2} I = \Sigma$$

where $\Sigma$ is the diagonal matrix whose diagonal elements are comprised of the singular values for R (also referred to as the singular value matrix), and the elements are in descending order.

At 712, the singular value matrix E is obtained based on the current matrix at convergence $R_m$ and output to an analytics engine or computation engine to be further processed, to a display to be presented, to a storage location to be saved for later use, etc.

The following numerical example illustrates an iterative cycle with reordering.

Initially, let $$R = \begin{matrix} 1.8558 & 0.6937 & 1.1155 & 0.8679 & 1.0834 & 2.2096 \\ 0.6937 & 1.2449 & 0.6195 & 0.9179 & 0.8984 & 1.2862 \\ 1.1155 & 0.6195 & 1.7748 & 0.7501 & 1.7089 & 2.1193 \\ 0.8679 & 0.9179 & 0.7501 & 1.0167 & 0.9268 & 1.5194 \\ 1.0834 & 0.8984 & 1.7089 & 0.9268 & 1.7662 & 2.1200 \\ 2.2096 & 1.2862 & 2.1193 & 1.5194 & 2.1200 & 3.5097 \end{matrix}$$

The Cholesky factor obtained by applying a Cholesky function to R is $$L_1 = \begin{matrix} 1.3623 & 0.5092 & 0.8188 & 0.6371 & 0.7953 & 1.6220 \\ 0 & 0.9927 & 0.2040 & 0.5978 & 0.4970 & 0.4636 \\ 0 & 0 & 1.0309 & 0.1033 & 0.9276 & 0.6757 \\ 0 & 0 & 0 & 0.4928 & 0.0551 & 0.2821 \\ 0 & 0 & 0 & 0 & 0.1522 & -0.2806 \\ 0 & 0 & 0 & 0 & 0 & 0.2212 \end{matrix}$$

Note that the diagonal elements of $L_1$ are not in descending order. The reordered matrix $\hat{L}_1$ is

| 1.3623 | 0.8188 | 0.5092 | 0.6371 | 0.7953 | 1.6220 |
|---|---|---|---|---|---|
| 0 | 1.0309 | 0 | 0.1033 | 0.9276 | 0.6757 |
| 0 | 0.2040 | 0.9927 | 0.5978 | 0.4970 | 0.4636 |
| 0 | 0 | 0 | 0.4928 | 0.0551 | 0.2821 |
| 0 | 0 | 0 | 0 | 0.1522 | −0.2806 |
| 0 | 0 | 0 | 0 | 0 | 0.2212 |

$\hat{L}_1{}'$ $\hat{L}_1$ are computed and used in the next iteration.

In current matrix analysis, a square matrix can be diagonalized using SVD to obtain its features. However, in many applications such as image processing, this may not be the best way to extract features. The process described in FIG. 8 finds a non-orthogonal matrix H that diagonalizes the original matrix very quickly.

Figure 8:
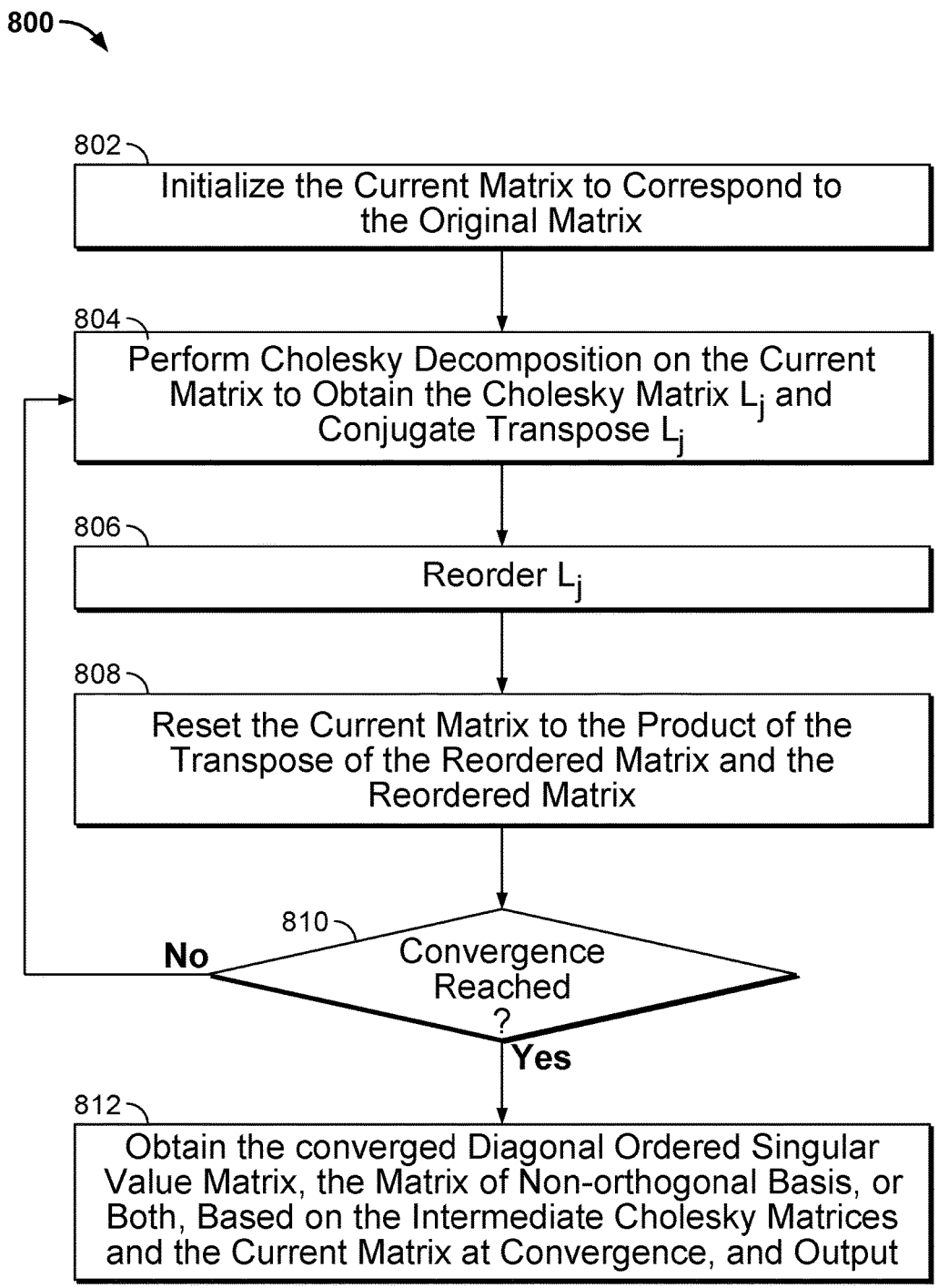
FIG. 8 is a flowchart illustrating another embodiment of a Cholesky-based decomposition process that obtains an non-orthogonal basis.

FIG. 8 is a flowchart illustrating another embodiment of a Cholesky-based decomposition process that obtains an non-orthogonal basis. Process 800 can be performed on a system such as 100.

802-810 of process 800 are similar to 702-710 of process 700, where the Cholesky decomposition is performed iteratively to achieve convergence. The intermediate Cholesky matrices $L_j$ are maintained.

Once convergence is achieved, at 812, a converged diagonal ordered singular value matrix $\Lambda$, a matrix of non-orthogonal basis H, and/or a non-symmetric factor matrix $\hat{H}$ are obtained based at least in part on the intermediate Cholesky matrices and the current matrix at convergence. One or more of the obtained properties are output.

Specifically, the original matrix $R_0$ can be rewritten using the Cholesky matrices and current matrices at successive iteration stages as follows:

$$R_0 = L_0 L_0^T = L_0 L_0^{-T} L_0^T L_0 L_0^{-1} L_0^T = (L_0 L_0^{-T})(L_0^T L_0)(L_0^{-1} L_0^T)$$
$$= (L_0 L_0^{-T})(R_1)(L_0^{-1} L_0^T)$$
$$= (L_0 L_0^{-T})((L_1 L_1^{-T}) R_2 (L_1^{-1} L_1^T))(L_0^{-1} L_0^T)$$
$$= (L_0 L_0^{-T})((L_1 L_1^{-T})((L_2 L_2^{-T}) R_3 (L_2^{-1} L_2^T))(L_1^{-1} L_1^T))(L_0^{-1} L_0^T)$$
$$= \dots$$
$$= \left\{\prod_{j=0}^{M}(L_j L_j^{-T})\right\} R_{M+1} \left\{\prod_{j=0}^{M}(L_j^{-1} L_j^T)\right\} = H R_{M+1} H^T$$
$$= H \Lambda H^T = H \Lambda^{\frac{1}{2}} \Lambda^{\frac{1}{2}} H^T = \hat{H}\hat{H}^T$$

where $\Lambda$ is the converged diagonal ordered singular value matrix, and H is a matrix of non-orthogonal basis for R. H is not unique and is not necessarily symmetric. H cannot be orthogonal because it is a product of a sequence of non-orthogonal matrices.

Mathematically, if a matrix is not full rank, it is not invertible (in other words, there is no A' that will give AA'=1). In practical applications such as data analysis, however, the pseudoinverse of such a matrix is often of interest because it allows non-invertible data matrices to be processed. By definition, the pseudoinverse (also referred to as the generalized inverse) of a matrix A is a matrix $A^\dagger$ that satisfies:

$AA^\dagger A=A$ $A^\dagger AA^\dagger=A^\dagger$ $(AA^\dagger)^\dagger=AA^\dagger$ i.e. symmetric $(A^\dagger A)^\dagger=A^\dagger A$ i.e. symmetric The Moore-Penrose pseudoinverse computed as $A^\dagger = V\Sigma^{-1}U'$ satisfies all those requirements. The current computation technique for the pseudoinverse, especially pseudoinverse of large matrix, is computationally intensive, slow, and not parallelizable.

Figure 9:
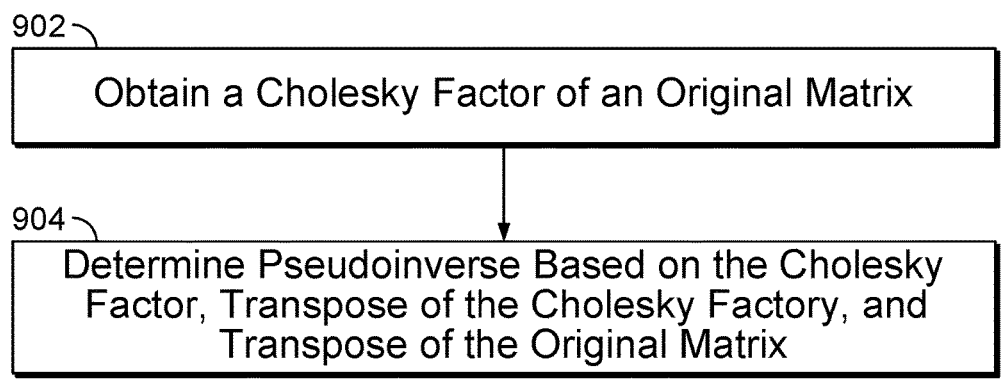
FIG. 9 is a flowchart illustrating an embodiment of a process for determining a pseudoinverse of a matrix.

FIG. 9 is a flowchart illustrating an embodiment of a process for determining a pseudoinverse of a matrix.

Process 900 can be performed on a system such as 100.

At 902, the Cholesky factor L of matrix A is obtained. L is preferably obtained via a process such as 600, but can also be obtained using other methods, such as the MATLAB chol( ) function.

At 904, the pseudoinverse $A^\dagger$ is determined based on the Cholesky factor L, the transpose of the Cholesky factor, and the transpose of the original matrix as follows:

$(A)^\dagger = L(L'L)^{-1}(L'L)^{-1}L'A'$

The derivation is as follows:

Consider the symmetric positive definite n×n matrix G' G, and assume that it is of rank r≤n. There exists a unique triangular matrix S with exactly n-r zero rows, and such that S'S=G' G, while the computation of S is an extension of the usual Cholesky factorization of non-singular matrices. Removing the zero rows from S one obtains a r×n matrix, say L', of full rank r, and we have $G'G=S'S=LL'$ A general relation between two matrices A and B pertaining to the Moore-Penrose Inverse is:

$(AB)^\dagger=B'(A'ABB')^\dagger A'$

Let B=I and substitute in the above equation, the following is obtained:

$(A)^\dagger=(A'A)^\dagger A'$ which will be used to get $(A)^\dagger$.

Figure 10A:
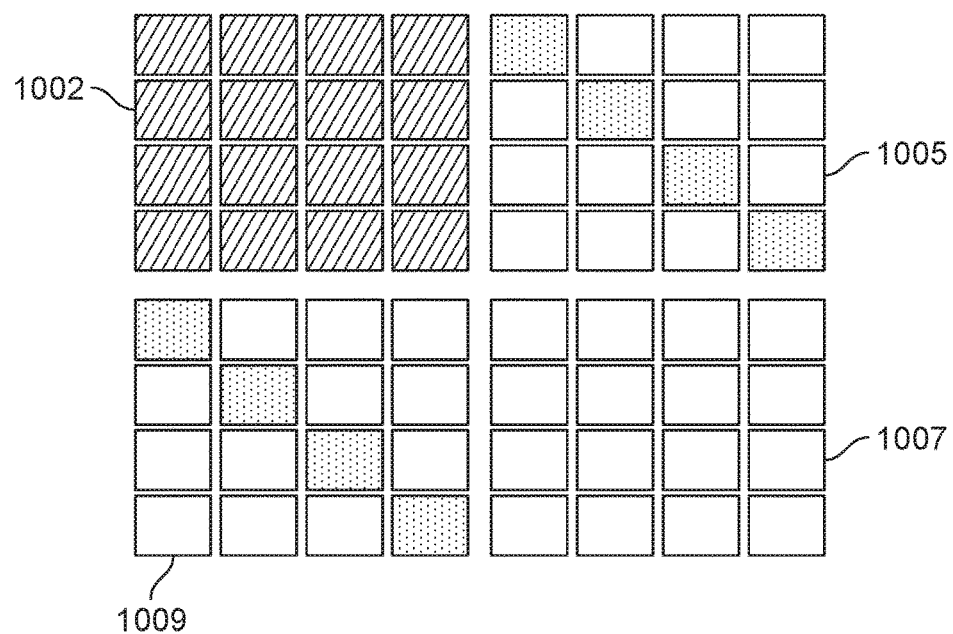
FIGS. 10A-10E are diagrams illustrating how parallelism is achieved in a process such as 200.
Figure 10B:
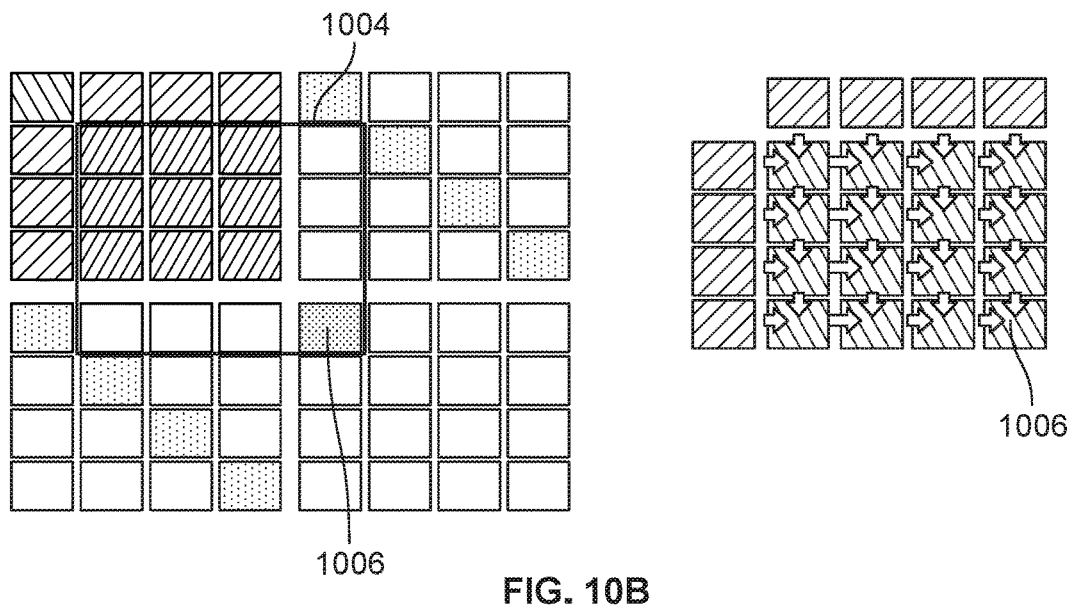
Figure 10C:
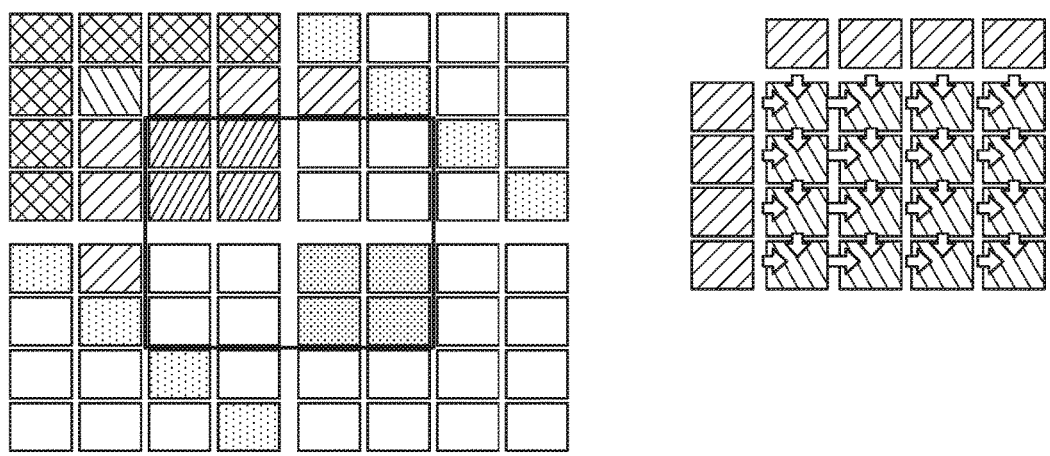
Figure 10D:
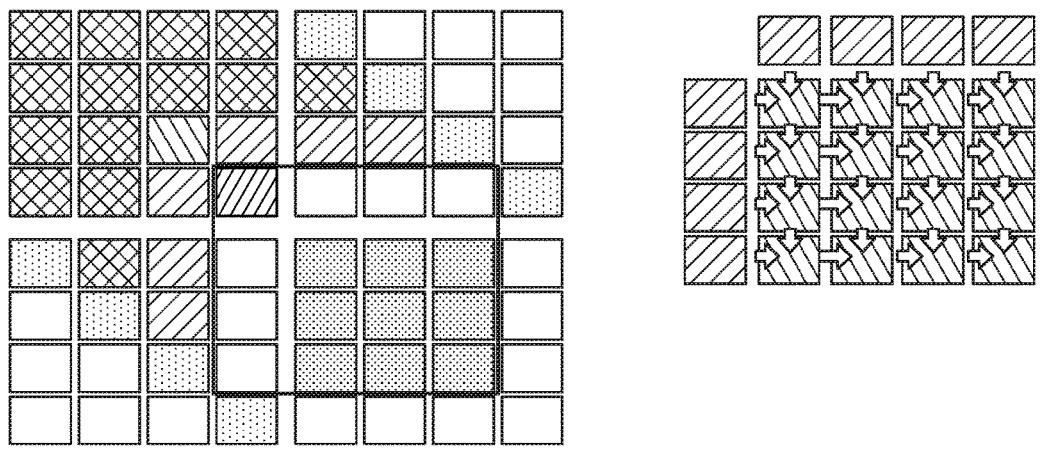
Figure 10E:
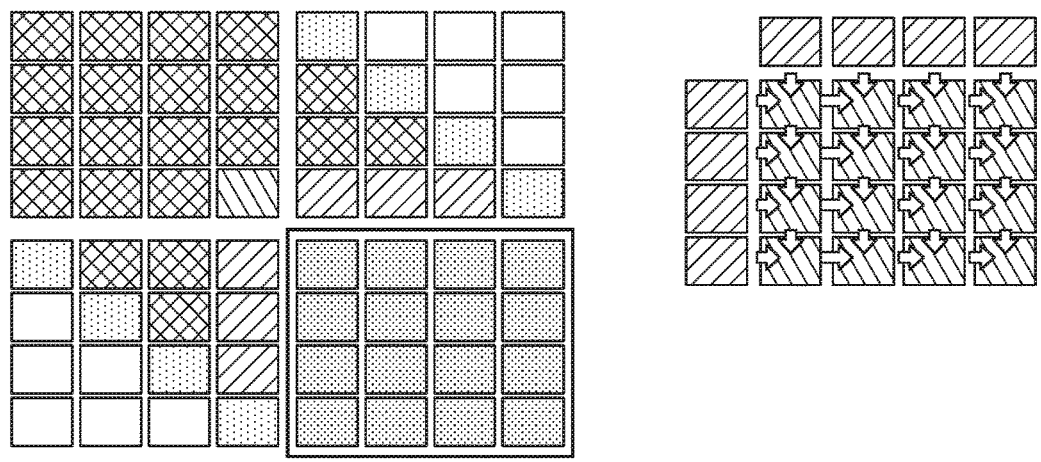

If instead, we let A'=B and find $(AA')^\dagger=A(A'A)^{-1}(A'A)^{-1}A'$ where $(A'ABB')^\dagger=(A'AA'A)^\dagger$ can be written as $(A'A)^{-1}$ $(A'A)^{-1}$ because each product A' A is full rank and has an actual inverse and not just a pseudo inverse. But from G' G=L L' if G=A' we have A A'=L L' and the matrix L L' is full rank matrix with an actual inverse and not just a pseudo inverse. Therefore $(AA')^\dagger=(LL')=A(A'A)^{-1}(A'A)^{-1}A'=L(L'L)^{-1}(L'L)^{-1}L'$ From the previous equation and from $(A)^\dagger=(A'A)^\dagger A'$ we get $(A)^\dagger=(A'A)^\dagger A'$ and $(A)^\dagger=L(L'L)^{-1}(L'L)^{-1}L'A'$ FIGS. 10A-10E are diagrams illustrating how parallelism is achieved in a process such as 200. In FIG. 10A, the original matrix 1002 is shown as the 4×4 shaded subblocks. Each subblock can be an element of the original matrix as well as a matrix in itself. Additional matrices 1005, 1007, and 1009 are combined with matrix 1002 to form the initial matrix. It is assumed that the matrices 1005 and 1009 are identity matrices and matrix 1007 is a zero matrix. In the first iteration, after the partition, the submatrix of 1004 is computed and obtained. Note that the computations to obtain each transformed subblock (e.g., block 1006) is independent of other subblocks; therefore, the computation of the transformed subblocks can be performed in parallel, on separate processors or other hardware components. Similarly, computations performed in successive iterations shown in FIGS. 10C-10E are also parallelizable. Thus, suppose that the original matrix is a 4M×4M matrix (e.g., a matrix comprising 4 million rows and 4 million columns), it can be divided into 16 subblocks of 1M×1M matrices, and the partition and transformation can take place on 1M×1M subblock level in parallel, thus reducing the amount of computational time to about $\frac{1}{16}$ of non-parallel processing time.

In addition, the technique also works efficiently for matrices that are not full rank. FIG. 11 is a chart showing the estimated amounts of computations needed for obtaining various properties according to some embodiments of the present application. As can be seen, in this example, the amount of computations for obtaining pseudo inverse, rank, and determinant is dependent on the rank of the matrix, and thus additional savings in computational cycles are achieved for matrices that are not full rank. This also significantly improves performance for large matrices that have low rank.

An iterative technique for obtaining matrix properties such as rank, inverse, pseudoinverse, Cholesky factors, determinant, and singular values has been disclosed. Through partitioning a matrix and transforming a submatrix of the partitions, the iterative technique determines desired property much more quickly than many existing techniques. It is also highly efficient and parallelizable.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A matrix processing method, comprising:
   initializing a current matrix based at least in part on an original matrix;
   iteratively determining a matrix property using a plurality of iteration cycles, including, in an iteration cycle:
      partitioning the current matrix to obtain a plurality of partitions, wherein the plurality of partitions includes a submatrix;
      modifying the submatrix based at least in part on other partitions of the plurality of partitions to provide a current matrix for a next iteration; and
      continuing to iterate until a condition is met;
   obtaining the matrix property from an iteration result; and
   outputting the matrix property.

2. The method of claim 1, wherein the matrix property includes one or more of: a rank of the original matrix, an inverse of the original matrix, a pseudoinverse of the original matrix, a is determinant of the original matrix, a determinant of a diagonal matrix of the original matrix, a Cholesky factor of the original matrix, a singular value of the original matrix, and/or a non-orthogonal basis of the original matrix.

3. The method of claim 1, wherein the submatrix is a lower-right partition, and the plurality of partitions further includes an upper-left partition, an upper-right partition, and a lower-left partition.

4. The method of claim 1, wherein:
   the submatrix is a lower-right partition;
   the plurality of partitions further includes an upper-left partition, an upper-right partition, and a lower-left partition; and
   the modifying of the submatrix including replacing the submatrix with Schur complement of the upper-left partition in the current matrix.

5. The method of claim 1, wherein the modifying of the submatrix includes determining at least some modified submatrix elements on a plurality of processors in parallel.

6. The method of claim 1, wherein:
   the original matrix is an n×n matrix, wherein n is an integer;
   the matrix property that is iteratively determined includes a rank of the original matrix;
   the current matrix is initialized to correspond to the original matrix;
   in the iteration cycle:
      the modifying of the submatrix based at least in part on other partitions of the plurality of partitions to provide the current matrix for the next iteration includes transforming the submatrix to correspond to a Schur complement of a scalar partition in the current matrix; and
      the condition is met when diagonal elements of the submatrix are zero, or when n−1 iterations cycles are executed; and
   upon meeting the condition, obtaining the matrix property from an iteration result includes obtaining the rank of the original matrix based on number of iteration cycles.

7. The method of claim 1, wherein:
   the original matrix is an n×n matrix, where n is an integer;
   the matrix property that is iteratively determined includes an inverse of the original matrix;
   the current matrix is initialized to correspond to a matrix constructed based on the original matrix, two identity matrices, and a zero matrix;
   in the iteration cycle:
      the modifying of the submatrix based at least in part on other partitions of the plurality of partitions to provide the current matrix for the next iteration includes transforming the submatrix to correspond to a Schur complement of a scalar partition in the current matrix; and
      the condition is met when n iteration cycles have been repeated; and
   upon meeting the condition, the inverse the original matrix is determined to corresponds to a submatrix of the current matrix.

8. The method of claim 7, further comprising:
   after the condition is met, obtaining a diagonal matrix D of an LDU factorization of the original matrix based at least in part on terms in the current matrix.

9. The method of claim 1, wherein:
   the original matrix is an n×n matrix, where n is an integer;
   the matrix property that is determined is a determinant of the original matrix;
   the current matrix is initialized to correspond to a matrix constructed based on the original matrix, two identity matrices, and a zero matrix;
   in the iteration cycle:
      the modifying of the submatrix based at least in part on other partitions of the plurality of partitions to provide the current matrix for the next iteration includes transforming the submatrix to correspond to a Schur complement of a scalar partition in the current matrix; and the condition is met when n iteration cycles have been repeated; and the method further comprises, after the condition is met:
obtaining a diagonal matrix of an LDU factorization of the original matrix from a resulting matrix at n-th iteration cycle;
computing the determinant of the original matrix based at least in part on a product of diagonal elements in the diagonal matrix.

10. The method of claim 1, wherein:
the matrix property that is iteratively determined includes a Cholesky factor of the original matrix;
the current matrix is initialized to correspond to a matrix constructed based on the original matrix, two identity matrices, and a zero matrix;
in the iteration cycle:
the modifying of the submatrix based at least in part on other partitions of the plurality of partitions to provide the current matrix for the next iteration includes transforming the submatrix to correspond to a Schur complement of a scalar partition in the current matrix; and
the method further comprises modifying brackets of the current matrix by dividing by a square root of the scalar partition of the current matrix.

11. The method of claim 1,
the matrix property that is iteratively determined includes a non-orthogonal basis of the original matrix;
the current matrix is initialized to correspond to a matrix constructed based on the original matrix, two identity matrices, and a zero matrix;
in the iteration cycle:
the modifying of the submatrix based at least in part on other partitions of the plurality of partitions to provide the current matrix for the next iteration includes transforming the submatrix to correspond to a Schur complement of a scalar partition in the current matrix; and
the method further comprises, in the iteration cycle:
modifying brackets of the current matrix by dividing by a square root of the scalar partition of the current matrix; and
obtaining an intermediate Cholesky factor for the iteration cycle;
the method further comprises, after the condition is met:
determining a non-orthogonal basis based at least in part on a product of the intermediate Cholesky factors and their transposes obtained during the plurality of iteration is cycles.

12. The method of claim 1, wherein:
the matrix property that is iteratively determined includes a Cholesky factor of the original matrix;
the method further comprises:
updating the original matrix to obtain an updated matrix, wherein the updated matrix includes an additional row vector, an additional column vector, and an additional scalar; and
determining a Cholesky factor of the updated matrix based at least in part on the Cholesky factor of the original matrix.

13. The method of claim 1, wherein:
the matrix property that is iteratively determined includes a solution for V–H $R^{-1}$S, wherein V, H, and S are known matrices, and R is the original matrix;

the current matrix is initialized to correspond to a matrix constructed as $$\begin{bmatrix} R & S \\ H & V \end{bmatrix};$$

in an iteration cycle:
the modifying of the submatrix based at least in part on other partitions of the plurality of partitions to provide the current matrix for the next iteration includes transforming the submatrix to correspond to a Schur complement of a scalar partition in the current matrix; and
the condition is met when n iteration cycles have been repeated; and
upon meeting the condition, the solution for V–H $R^{-1}$S is determined to corresponds to a lower right submatrix of the current matrix.

14. A method, comprising:
initializing a current matrix based at least in part on an original matrix;
iteratively determine singular values of the original matrix, including, in an iteration cycle:
determining a Cholesky factor of the current matrix and a transpose of the Cholesky factor;
resetting the current matrix to be a product of the transpose of the Cholesky factor and the Cholesky factor; and
continuing to iterate until non-diagonal elements of the current matrix are zero or is substantially close to zero; and
obtaining singular values from diagonal elements of the current matrix; and
outputting the singular values.

15. The method of claim 14, further comprising, in the iteration cycle, reordering the Cholesky factor according to values of the diagonal elements of the Cholesky factor.

16. A method, comprising:
obtaining a Cholesky factor of an original matrix (A);
determining a pseudoinverse of the original matrix based at least in part on a Cholesky factor (L) of the original matrix, a transpose (L') of the Cholesky factor of the original matrix, and a transpose (A') of the original matrix; and
outputting the pseudoinverse of the original matrix.

17. The method of claim 16, wherein the pseudoinverse ($A^\dagger$) of the original matrix is A determined as $(A)^\dagger$=L (L' L)$^{-1}$ (L' L)$^{-1}$ L' A'.

18. A system for matrix processing, comprising:
a plurality of processors configured to:
initialize a current matrix based at least in part on an original matrix;
iteratively determine a matrix property using a plurality of iteration cycles, including, in an iteration cycle:
partition the current matrix to obtain a plurality of partitions, wherein the plurality of partitions includes a submatrix;
modify the submatrix based at least in part on other partitions of the plurality of partitions to provide a current matrix for a next iteration; and
continue to iterate until a condition is met;
obtain the matrix property from an iteration result; and
output the matrix property;
to one or more memories coupled to the plurality of processors and configured to provide the plurality of processors with instructions.

19. A computer program product for matrix processing, the computer program product being embodied in a tangible computer readable storage medium and comprising computer instructions for:
  is initializing a current matrix based at least in part on an original matrix;
  iteratively determining a matrix property using a plurality of iteration cycles, including, in an iteration cycle:
    partitioning the current matrix to obtain a plurality of partitions, wherein the plurality of partitions includes a submatrix;
    modifying the submatrix based at least in part on other partitions of the plurality of partitions to provide a current matrix for a next iteration; and
    continuing to iterate until a condition is met;
  obtaining the matrix property from an iteration result; and
  outputting the matrix property.

* * * * *

UNITED STATES PATENT AND TRADEMARK OFFICE
CERTIFICATE OF CORRECTION

PATENT NO. : 10,489,481 B1
APPLICATION NO. : 15/901540
DATED : November 26, 2019
INVENTOR(S) : Roy Batruni Page 1 of 1

It is certified that error appears in the above-identified patent and that said Letters Patent is hereby corrected as shown below:

In the Specification

In Column 1, Line 18, delete "Modem" and insert --Modern--, therefor.

Signed and Sealed this
Thirty-first Day of March, 2020

Andrei Iancu
*Director of the United States Patent and Trademark Office*